(12) United States Patent
Bin Redhwan et al.

(10) Patent No.: US 12,035,180 B2
(45) Date of Patent: Jul. 9, 2024

(54) FIRST NETWORK NODE, WIRELESS DEVICE AND METHODS PERFORMED THEREBY FOR HANDLING A LINK SWITCH

(71) Applicant: Telefonaktiebolaget LM Ericsson (publ), Stockholm (SE)

(72) Inventors: Sakib Bin Redhwan, Linköping (SE); Nicklas Johansson, Brokind (SE); Pradeepa Ramachandra, Linköping (SE); Reza Moosavi, Linköping (SE); Sofia Ek, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 657 days.

(21) Appl. No.: 17/268,713

(22) PCT Filed: Aug. 15, 2019

(86) PCT No.: PCT/SE2019/050748
§ 371 (c)(1),
(2) Date: Feb. 16, 2021

(87) PCT Pub. No.: WO2020/036530
PCT Pub. Date: Feb. 20, 2020

(65) Prior Publication Data
US 2021/0321306 A1    Oct. 14, 2021

Related U.S. Application Data

(60) Provisional application No. 62/765,011, filed on Aug. 17, 2018.

(51) Int. Cl.
*H04W 36/00* (2009.01)
*H04W 36/08* (2009.01)
(Continued)

(52) U.S. Cl.
CPC .. *H04W 36/0058* (2018.08); *H04W 36/00837* (2018.08); *H04W 36/08* (2013.01);
(Continued)

(58) Field of Classification Search
CPC .. H04W 36/00; H04W 36/30; H04W 36/0058; H04W 36/00837; H04W 36/08;
(Continued)

(56) References Cited

U.S. PATENT DOCUMENTS 9,100,858 B2 * 8/2015 Chang ............ H04W 76/27
2012/0178455 A1 * 7/2012 Sato ............... H04W 36/32
455/436
(Continued)

FOREIGN PATENT DOCUMENTS

CN    103582038 A    2/2014
CN    103718604 A    4/2014
(Continued)

OTHER PUBLICATIONS

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.2.0, 3GPP Organizational Partners, Jun. 2018, 791 pages.
(Continued)

*Primary Examiner* — Nam T Huynh
(74) *Attorney, Agent, or Firm* — Weisberg I.P. Law, P.A.

(57) ABSTRACT

A first network node transmits, to a wireless device, a first indication. The first indication indicates to select, out of a plurality of target links simultaneously fulfilling a respective condition to switch from a source link to a target link, a first target link to switch from the source link to the selected first target link. The selecting is based on at least one of: a Reference Signal Received Power (RSRP) value, a Refer-
(Continued)

ence Signal Received Quality (RSRQ) value, a Signal to Interference and noise ratio (SINR) value, a priority, Random Access Channel (RACH) resources, a cell in which latest measurements were made, or a frequency, of the respective target links in the plurality of target links. The first network node then handles the link switch from the source link to the target link, based on the transmitted first indication.

11 Claims, 15 Drawing Sheets

(51) Int. Cl.
*H04W 36/36* (2009.01)
*H04W 74/0833* (2024.01)
*H04W 76/27* (2018.01)

(52) U.S. Cl.
CPC ..... *H04W 36/362* (2023.05); *H04W 74/0833* (2013.01); *H04W 76/27* (2018.02)

(58) Field of Classification Search
CPC ........... H04W 36/362; H04W 74/0833; H04W 76/27; H04W 36/00838
See application file for complete search history.

(56) References Cited

U.S. PATENT DOCUMENTS

2017/0238228 A1  8/2017  Zhang et al.
2021/0314833 A1* 10/2021  Hao ................ H04W 36/00837

FOREIGN PATENT DOCUMENTS

| CN | 105612786 A | 5/2016 |
| WO | 2012176010 A2 | 12/2012 |
| WO | 2018132051 A1 | 7/2018 |
| WO | 2019098910 A1 | 5/2019 |
| WO | 2020036530 A1 | 2/2020 |

OTHER PUBLICATIONS

Ericsson, "R2-1700864: Conditional Handover," Third Generation Partnership Project (3GPP), TSG-RAN WG2 #97, Jan. 13-17, 2017, 6 pages, Athens, Greece.
Intel Corporation, "R2-1703414: NW controlled autonomous handover," Third Generation Partnership Project (3GPP), TSG RAN WG2 Meeting #97bis, Apr. 3-7, 2017, 4 pages, Spokane, USA.
International Search Report and Written Opinion for International Patent Application No. PCT/SE2019/050748, mailed Nov. 25, 2019, 15 pages.
Chinese Office Action and Search Report with English Machine Translation dated Sep. 27, 2023, for Patent Application No. 201980053308.3, consisting of 22-pages.

* cited by examiner a)

b)

a)

b)

a)

b)

a)

b)

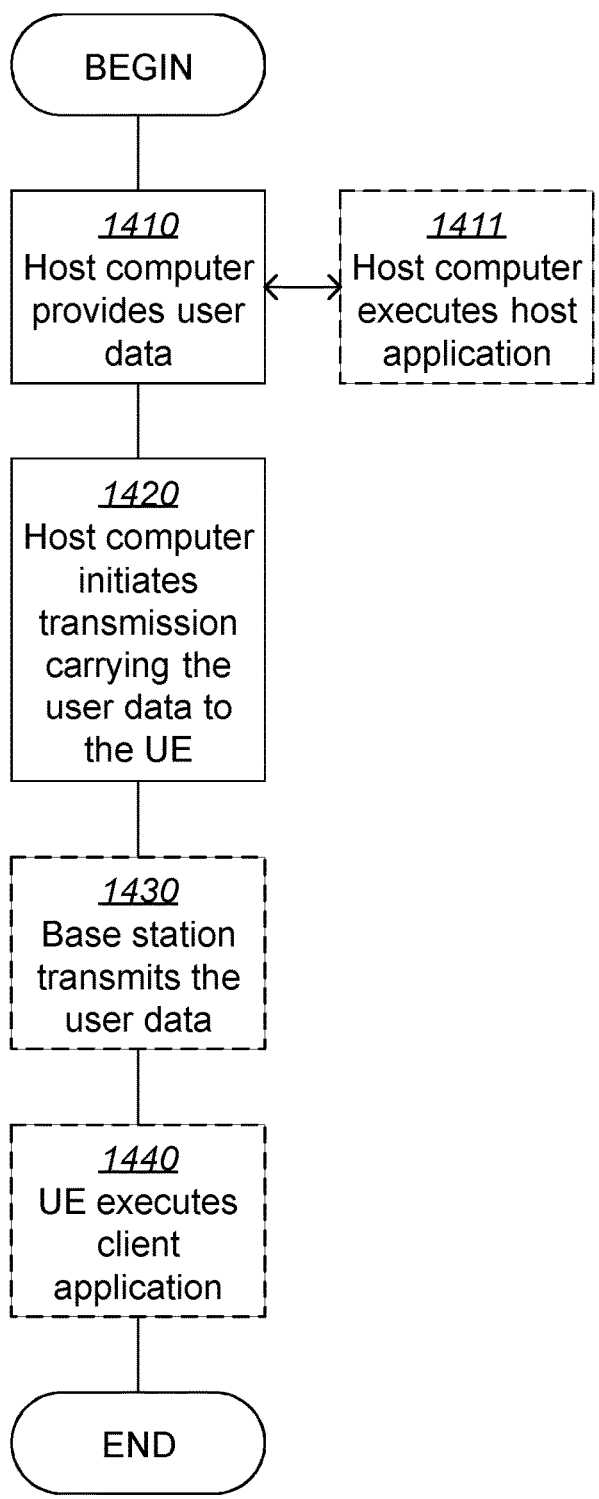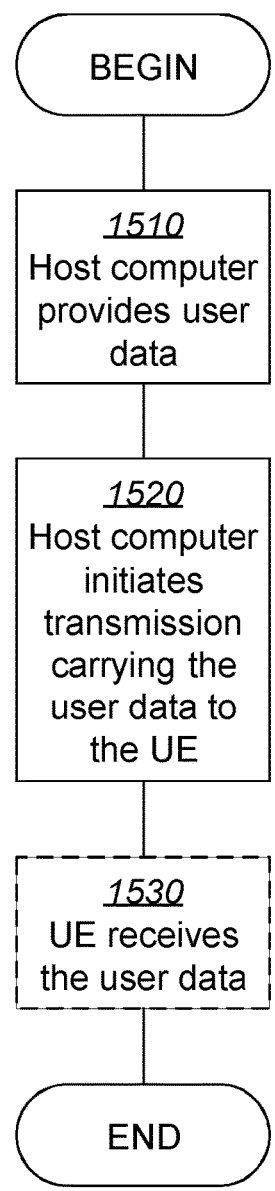
FIG. 14
FIG. 15

FIRST NETWORK NODE, WIRELESS DEVICE AND METHODS PERFORMED THEREBY FOR HANDLING A LINK SWITCH

This application is a 35 U.S.C. § 371 national phase filing of International Application No. PCT/SE2019/050748, filed Aug. 15, 2019, which claims the benefit of U.S. Provisional Application No. 62/765,011, filed Aug. 17, 2018, the disclosures of which are incorporated herein by reference in their entireties.

TECHNICAL FIELD

The present disclosure relates generally to a first network node, and methods performed thereby, for handling a link switch by a wireless device, from a source link to a target link. The present disclosure additionally relates generally to a wireless device, and methods performed thereby, for handling the link switch from the source link to the target link.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

NR

The so-called 5G system, from a radio perspective started to be standardized in 3GPP, and the so-called New Radio (NR) is the name for the radio interface. NR architecture is being discussed in 3GPP. In the current concept, gNB denotes NR BS, where one NR BS may correspond to one or more transmission and/or reception points.

One of the main goals of NR is to provide more capacity for operators to serve ever increasing traffic demands and variety of applications. Because of this, NR will be able to operate on high frequencies, such as frequencies over 6 GHz until 60 or even 100 GHz.

In comparison to the current frequency bands allocated to LTE, some of the new bands will have much more challenging propagation properties such as lower diffraction and higher outdoor and/or indoor penetration losses. As a consequence, signals will have less ability to propagate around corners and penetrate walls. In addition, in high frequency bands atmospheric and/or rain attenuation and higher body losses render the coverage of NR signals even more spotty.

Fortunately, the operation in higher frequencies makes it possible to use smaller antenna elements, which enables antenna arrays with many antenna elements. Such antenna arrays facilitate beamforming, where multiple antenna elements may be used to form narrow beams and thereby compensate for the challenging propagation properties.

Despite the link budget gains provided by beamforming solutions, reliability of a system purely relying on beamforming and operating in higher frequencies may be challenging, since the coverage may be more sensitive to both time and space variations. As a consequence of that, the Signal to Interference and Noise Ratio (SINR) of such a narrow link may drop much quicker than in the case of LTE.

One of the areas that will be particularly affected by the characteristics of NR is handover. Already in LTE, the 3GPP specification group RAN2 observed that the serving cell may not be able to convey the handover command timely. Lowering the Time To Trigger (TTT) and the measurement hysteresis allowed to reduce the handover failure rate, but also resulted in higher ping-pong probability. It is expected that in NR these effects will be even more pronounced when operating at higher frequency bands. Because of these aspects, attention to mobility robustness in NR systems may be needed.

In LTE and NR, different solutions to increase mobility robustness have been discussed. One area of solutions is based on Dual Connectivity introduced in LTE Rel-12. In Dual Connectivity, the UE may be connected to two network nodes at the same time. This may be understood to allow improving mobility robustness by serving control plane traffic, e.g., used for measurement reporting and handover command, by more robust macro layer on low frequency and providing capacity boost by higher frequencies. This feature may be called User Plane/Control Plane (UP/CP) split. One variant of Dual Connectivity is the RRC diversity feature, which may allow sending control plane signaling over two nodes. This may be understood to increase diversity in temporal and spatial domain and thus to increase robustness.

One issue of Dual Connectivity solutions is that the UE may need to be served with two connections. This may become problematic as network resources are consumed more. In addition, Dual Connectivity may require two different Reception/Transmission (RX/TX) chains in the UE side, which increases the device manufacturing cost. Because of that, also alterative solutions may need to be considered.

One solution discussed in a RAN2 #9x meeting is called "early handover command" or "conditional handover command". In order to avoid the undesired dependence on the serving radio link upon the time, and radio conditions, where the UE may need to execute the handover, NR may offer the possibility to provide Radio Resource Control (RRC) signaling for the handover to the UE earlier. To achieve this, it may be possible to associate the HandOver (HO) command with a condition. As soon as the condition is fulfilled, the UE may execute the handover in accordance with the provided handover command.

Such a condition may e.g., be that the quality of the Reference Signal (RS), Synchronization Signal Block (SSB) or Channel State Information-Reference Signals (CSI-RS), of the target cell or beam becomes X dB stronger than the RS (SSBs or CSI-RSs) of the serving cell. The threshold Y used in a preceding measurement reporting event may then be chosen lower than the one in the handover execution condition. This may be understood to allow the serving cell to prepare the handover upon reception of an early measurement report and to provide the RRCConnectionReconfiguration with mobilityControlInfo, (in LTE, whereas in the 'E-UTRAN New Radio-Dual Connectivity (NR EN-DC) specification, this name of the message and IEs are changed to RRCReconfiguration with CellGroupConfig, respectively), at a time when the radio link between the source cell and the UE is still stable. The execution of the handover may be done at a later point in time, and threshold, which may be considered optimal for the handover execution.

FIG. 1 depicts an example of a conditional handover execution with just a serving and a target cell, as well as a UE 13. The serving cell is under the control of a serving gNB 11, and the target cell is under the control of a target gNB 12. The serving gNB 11 transmits User Plane (UP) data. At 1, the UE, sends a measurement report to the gNB 11, using a lower threshold than the one in a handover execution condition. Based on the received early measurement report, the gNB 11 makes a handover decision, and at 2, it sends an early HO request to the target gNB 12. The target gNB receives the early HO request, accepts the HO, and builds an RRC configuration. At 3, the target gNB 12 sends a HO acknowledgement message to the serving gNB 11, including the RRC configuration. At 4, the serving gNB 11 sends a conditional HO command to the UE 13 with a high threshold. When the measurements by the UE 13 fulfil the HO condition, the UE 13 triggers the pending conditional HO. At 5, the UE 13 performs synchronization and random access with the target gNB 12, and sends a HO confirm at 6. The target gNB 12 notifies the serving gNB 11 that the HO has been completed at 7, and sends UP data to the UE 13 from that point on. In practice, there often may be many cells or beams that the UE may have reported as possible candidates based on its preceding Radio Resource Management (RRM) measurements. The network may then have the freedom to issue conditional handover commands for several of those candidate target cells. The RRCConnectionReconfiguration/RRCReconfiguration (LTE/NR EN-DC; in the sub-sequent text RRCConnectionReconfiguration is used and it may be mapped to the RRCReconfiguration message for NR) for each of those candidates may differ e.g., in terms of the HO execution condition, Reference Signal (RS) to measure and threshold to exceed, as well as in terms of the Random Access (RA) preamble to be sent when a condition is met. As a side note, Mobility Reference Signal (MRS) may be used herein exclusively to denote the reference signal used for mobility purposes. For instance, in NR, MRS may be either Synchronization Signal Block (SSB) or Channel State Information-Reference Signals (CSI-RS).

The RRCConnectionReconfiguration may typically be a "delta" to the UE's current configuration. In LTE, the UE may be required to apply RRCConnectionReconfiguration messages in the order in which it may receive them. On the other hand, Universal Mobile Telecommunications System (UMTS) allowed associating a reconfiguration message with an "Activation Time". The Radio network controller (RNC) configured the target network node to accept a UE at a time in future, a.k.a. the Activation time. It also configured the UE through the source network node to perform handover at the same time. In theory, if both perform the action at the same time, the UE could be connected to the target network node. This led to race conditions and numerous problems when the UE received a first reconfiguration with a longer Activation Time than the Activation Time of a subsequent reconfiguration message. The LTE mechanism may be understood to be simpler and more robust and may be adopted also for NR.

And it may need to be ensured that the "conditional handover" mechanism discussed above does not suffer from similar problems as the activation time problems observed in UMTS.

As explained above, the triggering condition associated with the HO command sent to the UE may need to evaluate measurements and trigger the handover when those conditions may be fulfilled. But since the HO command may typically be a delta to the UE's current RRC configuration, it may be necessary to address how to handle subsequent RRCConnectionReconfiguration messages arriving from the source cell if the UE has not yet executed the handover.

When the UE receives a "conditional HO command" it may interpret the RRCConnectionReconfiguration with mobilityControlInfo as delta to its current configuration, unless it is a full configuration message. It may in principle determine the target configuration immediately upon reception of the command but it may need to apply/execute it only if the associated condition is fulfilled. While the UE evaluates the condition it may continue operating per its current RRC configuration, that is, without applying the conditional HO command.

When the UE determines that the condition is fulfilled, it may disconnect from the serving cell, apply the conditional HO command and connect to the target cell. These steps may be considered equivalent to the current, instantaneous handover execution. Once the UE applies the RRCConnectionReconfiguration including mobilityControlInfo, it may be required to not process any subsequent RRCConnectionReconfiguration messages received prior to the HO execution. The latter is the intended behavior already in LTE.

Existing methods for performing conditional handover may lead to radio link failure, and other problems that may hinder the mobility of a wireless device in a network.

SUMMARY

It is an object of embodiments herein to improve the handling of a link switch of a wireless device from a source link to a target link in a wireless communications network.

According to a first aspect of embodiments herein, the object is achieved by a method performed by a first network node. The method is for handling a link switch by a wireless device from a source link to a target link. The first network node and the wireless device operate in a wireless communications network. The first network node transmits, to the wireless device, a first indication. The first indication indicates to select, out of a plurality of target links simultaneously fulfilling a respective condition to switch from a source link to a target link, a first target link to switch from the source link to the selected first target link. The selecting is based on at least one of: a Reference Signal Received Power (RSRP) value, a Reference Signal Received Quality (RSRQ) value, a Signal to Interference and noise ratio (SINR) value, a priority, Random Access Channel (RACH) resources, a cell in which latest measurements were made, or a frequency, of the respective target links in the plurality of target links. The first network node also handles the link switch from the source link to the target link, based on the transmitted first indication.

According to a second aspect of embodiments herein, the object is achieved by a method performed by the wireless device. The method is for handling the link switch from the source link to the target link. The wireless device operates in the wireless communications network. The wireless device obtains, a first indication. The first indication indicates to select, out of the plurality of target links simultaneously fulfilling the respective condition to switch from the source link to the target link, the first target link to switch from the source link to the selected first target link. The selecting is based on at least one of: the RSRP value, the RSRQ value, the SINR value, the priority, the RACH resources, the cell in which latest measurements were made, or the frequency, of the respective target links in the plurality of target links. The wireless device also executes the link switch from the source link to the target link, based on the obtained first indication.

According to a third aspect of embodiments herein, the object is achieved by the first network node. The first network node may be considered to be for handling the link switch by the wireless device, from the source link to the target link. The first network node and the wireless device are configured to operate in the wireless communications network. The first network node is further configured to transmit, to the wireless device the first indication. The first indication is configured to indicate to select, out of the plurality of target links simultaneously fulfilling the respective condition to switch from the source link to the target link, the first target link to switch from the source link to the selected first target link. The selecting is configured to be based on at least one of: the RSRP value, the RSRQ value, the SINR value, the priority, the RACH resources, the cell in which latest measurements were made, or the frequency, of the respective target links in the plurality of target links. The first network node is also configured to handle the link switch from the source link to the target link, based on the transmitted first indication.

According to a fourth aspect of embodiments herein, the object is achieved by the wireless device. The wireless device may be considered to be for handling the link switch of the wireless device from the source link to the target link. The wireless device is configured to operate in the wireless communications network. The wireless device is further configured to, obtain the first indication. The first indication is configured to indicate to select, out of the plurality of target links simultaneously fulfilling the respective condition to switch from the source link to the target link, the first target link to switch from the source link to the selected first target link. The selecting is configured to be based on at least one of: the RSRP value, the RSRQ value, the SINR value, the priority, the RACH resources, the cell in which latest measurements were made, or the frequency, of the respective target links in the plurality of target links. The wireless device is also configured to execute the link switch from the source link to the target link, based on the first indication configured to be obtained.

By the first network node transmitting the first indication, the first network node enables the wireless device with guidance on which target cell to choose in the scenario when more than one target cell, e.g., for which the RRCConnectionReconfiguration may be available, may fulfil the threshold criterion that may, e.g., be configured in a conditional handover command, so that it may be clear to the wireless device 130 which cell to choose for handover execution. The guidance may be used to e.g., prioritize intra frequency carriers when latency may be important or to prioritize inter frequency carriers when load sharing/balancing may be needed.

BRIEF DESCRIPTION OF THE DRAWINGS

Examples of embodiments herein are described in more detail with reference to the accompanying drawings, and according to the following description.

FIG. 14 is a flowchart depicting embodiments of a method in a communications system including a host computer, a base station and a user equipment, according to embodiments herein.

FIG. 15 is a flowchart depicting embodiments of a method in a communications system including a host computer, a base station and a user equipment, according to embodiments herein.

DETAILED DESCRIPTION

Figure 1:
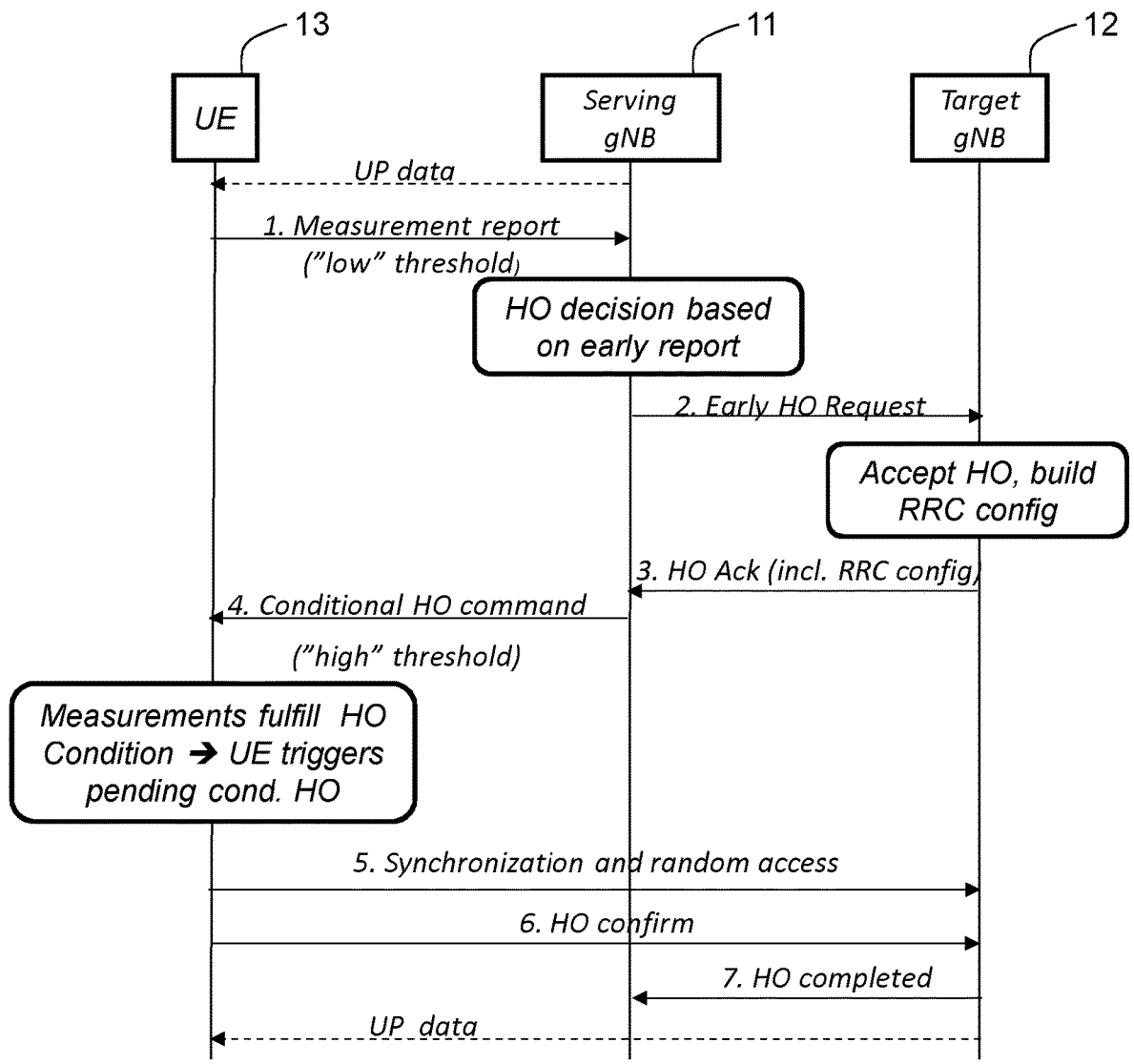
FIG. 1 is a schematic diagram illustrating a conditional handover execution, according to existing methods.

As part of the development of embodiments herein, one or more challenges with the existing technology will first be identified and discussed.

The existing conditional handover command related solutions have problems associated to an absence of a single target link fulfilling the threshold criterion that may have been configured in the conditional handover command, either because a plurality of target links fulfils the threshold criterion, or because no target link fulfils the threshold criterion. Accordingly, there are two problems associated to the existing conditional handover command related solutions. These problems may be understood to be related to the UE actions when it has received the conditional handover command, e.g., RRCConnectionReconfiguration from the serving cell containing the mobilityControlInfo, message and a certain event has occurred. The first problem is that in scenarios when more than one cell is configured as part of the handover command, e.g., RRCConnectionReconfiguration message sent from the serving cell, there may be scenarios when more than one target cell for which the RRCConnectionReconfiguration is available fulfils the threshold criterion that is configured in the conditional handover command. In such a scenario, it is not clear as to which cell do the UE choose for handover execution.

The second problem is related to scenarios, when the conditions as configured in the conditional handover command are never fulfilled, but the T310 timer running at the UE expires. This scenario may be more probable to occur when the UE may be configured with larger thresholds in the conditional handover command and there may be multiple neighbor cells causing interference at the UE's location. In such a scenario, the UE may declare Radio Link Failure (RLF) and perform the RRCConnectionReestablishment procedure. There are two problems associated to this procedure: a) There is no control over which cell the UE is to perform the re-establishment, and b) The RLF will look as a bad Key Performance Indicator (KPI) in the operators monitoring system.

In WO 2018/132051, the problem associated to overriding an existing RRCConnectionReconfiguration message for a particular target cell with the latest RRCConnectionReconfiguration message from the same target cell is discussed. The UE behavior upon such an update is mentioned to use the latest RRCConnectionReconfiguration message. Different ways of providing the updated RRCConnectionReconfiguration have also been described, as a delta of the existing message, a way to provide a combined RRCConnectionReconfiguration RRCConnectionReconfiguration message involving more than one target cell etc.

In yet a non-published internal reference implementation, solutions for the problem related to priority ordering of the cells for which the conditional handover command is sent is mentioned. The proposed solutions also discuss how the serving cell and the neighboring cells may exchange priority related information in order to optimize the resource allocation in the target cells.

However, the above mentioned problems remain unaddressed. Certain aspects of the present disclosure and their embodiments may provide solutions to these challenges or other challenges. There are, proposed herein, various embodiments which address one or more of the issues disclosed herein.

As a brief overview, embodiments herein may be understood to relate to UE behavioral solutions for each of the problems mentioned above. In a first group of embodiments, for the first problem, when more than one condition as configured in the RRCConnectionReconfiguration message may be fulfilled, the UE may be required to select the target cell based on one or more of the following options. The parameter to be used, e.g., Reference Signal Received Power (RSRP), Signal to Interference and noise ratio (SINR), Reference Signal Received Quality (RSRQ), highest priority, Random Access Channel (RACH) resource availability etc., for the selection may either be configured in the RRCConnectionReconfiguration message sent by the serving cell, or this may be the mandated behavior in the specification or may be up to UE implementation. Amongst the cells that fulfil the condition, one or more of the following may be implemented: a) Select the cell which has the strongest RSRP value; or b) Select the cell which has the strongest RSRQ value; or c) Select the cell which has the strongest SINR value; or d) Select the cell which has the highest priority; or e) Select the cell whose allocated RACH resources are first occurring; f) For measurements involving an inter-frequency case, that is, when the UE may need measurement gap(s) to perform measurements, the UE may not perform measurements every measurement interval, but more seldom, and interpolate the measurements in between those measurements, and if the such interpolated measurements'-based decision satisfies the conditional handover related trigger, select the cell in which the UE has actually performed the measurement instead of using the interpolated measurement; further detail is provided in the description of FIG. 5, as further explanation for the scenario of selecting the cell towards which the UE may have performed the latest measurement; g) If the RRCConnectionReconfiguration message includes both intra-frequency and inter-frequency related handover messages, select the cell based on the following. In one example i) of option g), the UE may be required to always prioritize the intra-frequency related handover execution. This is the solution that may be considered to be more important for latency critical applications wherein performing an inter-frequency related handover may involve larger delay due to re-synchronization requirements in the new carrier. However, this solution may reduce the possibility to have an inter-frequency load sharing and/or balancing feature to use the conditional handover effectively; In another example ii) of option g), the UE may be required to always prioritize the inter-frequency related handover execution. This is the solution that may be considered to be more important for load sharing and/or balancing applications wherein the serving cell and/or frequency may be overloaded compared to the neighboring frequencies. However, this solution may potentially increase the latency as the UE may need to resynchronize to the new frequency before performing handover execution; iii) In another example of option g), the network may be able to provide priorities per target cell included in the conditional handover command, independent of the frequencies to which these target cells may belong to. This is one realization of the priority based embodiment as mentioned in option d) of the first group of embodiments; iv) In yet another example of option g), the network may provide two sets of priorities; one related to frequency specific priority and the other related to cell specific priority within a frequency carrier. The second priority may be considered to be one realization of the option d) of the first group of embodiments mentioned above.

In a second group of embodiments, for the second problem, as the RRCConnectionReconfiguration message with mobilityControlInfo may already be provided, the UE may be required to not declare RLF, but execute the handover as received in the RRCConnectionReconfiguration message. This behavior may be controlled by a bit in the conditional handover message; if the bit is set, then the UE may be required to declare RLF if T310 expires, and if the bit is not set, then the UE may be required to access the cell for which the RRCConnectionReconfiguration message may be provided. In addition, there may be a condition to inform whether the UE may be required to wait until the expiry of T310 or if it may start the handover execution upon the T310 related timer fulfils 'X' amount of its actual configured duration, e.g., 50% or 75%. This may also be in terms of the number of Out-of-sync (OOS) indications from the lower layer within a configured duration while T310 may still be running. If there are multiple cells for which the UE is configured with RRCConnectionReconfiguration message, then the UE may select the cell to perform handover execution based on the solutions proposed for the first problem.

Embodiments herein may therefore be understood to be related to UE behavior upon receiving a conditional handover. In general, embodiments herein may therefore be understood to be related to conditional handover, handover command, NR, LTE, and/or RLF.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

The following terminology may be used in the text herein. A condition handover message of LTE may be understood to correspond to an RRCConnectionReconfiguration message with mobilityControlInfo, from one or more cells, containing the conditions for handover execution. A condition handover message of NR may be understood to correspond to an RRCReconfiguration message with mobilityControlInfo, from one or more cells, containing the conditions for handover execution.

Figure 2:
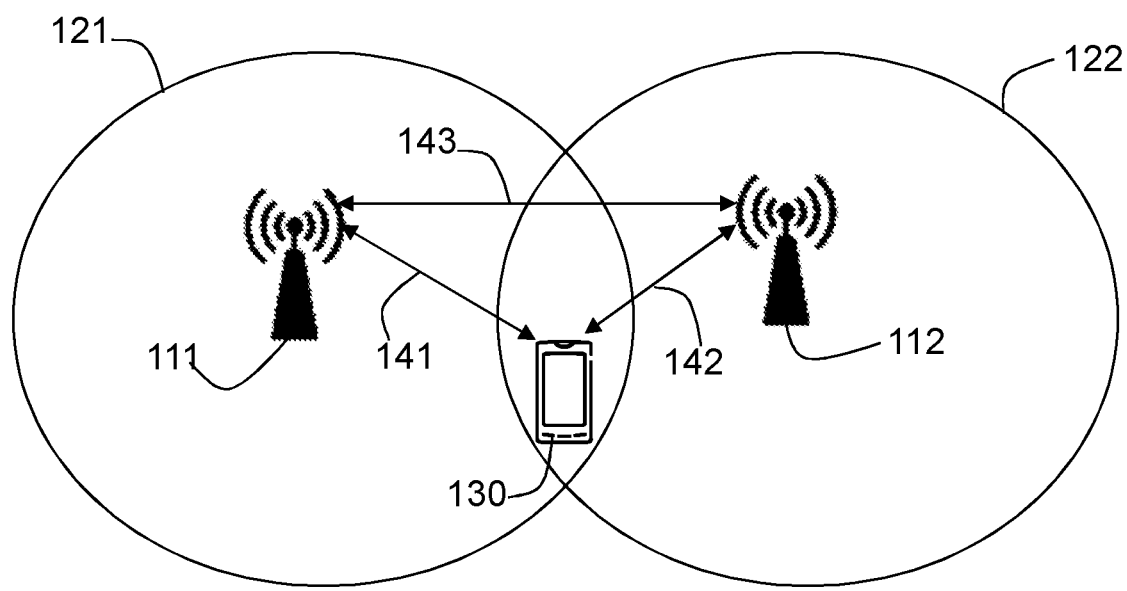
FIG. 2 is a schematic diagram illustrating a wireless communications network, according to embodiments herein.

FIG. 2 depicts a non-limiting example of a wireless communications network 100, which may be a wireless communications network, sometimes also referred to as a wireless communications system, cellular radio system, or cellular network, in which embodiments herein may be implemented. The wireless communications network 100 may typically be a 5G system, 5G network, NR-U or Next Gen System or network, LAA, or MulteFire. The wireless communications network 100 may alternatively be a younger system than a 5G system. The wireless communications network 100 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, and/or Narrow Band Internet of Things (NB-IoT). Thus, although terminology from 5G/NR and LTE may be used in this disclosure to exemplify embodiments herein, this should not be seen as limiting the scope of the embodiments herein to only the aforementioned systems.

The wireless communications network 100 comprises a plurality of network nodes, whereof a first network node 111 and a second network node 112, also referred to herein as a network node 112, are depicted in the non-limiting example of FIG. 2. Any of the first network node 111, and the second network node 112 may be a radio network node, such as a radio base station, or any other network node with similar features capable of serving a user equipment, such as a wireless device or a machine type communication device, in the wireless communications network 100. In some embodiments, the first network node 111 is an eNB and the second network node 112 is a gNB. In other embodiments, the first network node 111 is a first gNB, and the second network node 112 is a second gNB. This particular example is depicted in the non-limiting example of FIG. 2. In yet other embodiments, the first network node 111 may be a MeNB and the second network node 112 may be a gNB. In some examples, any of the first network node 111, and the second network node 112 may be co-localized, or be part of the same network node. In embodiments herein, the first network node 111 may be referred to as a source node or source network node, whereas the second network node 112 may be referred to as a target node or target network node.

The wireless communications network 100 covers a geographical area which may be divided into cell areas, wherein each cell area may be served by a network node, although, one network node may serve one or several cells. In the non-limiting example of FIG. 2, the wireless communications network 100 comprises a first cell 121 and a second cell 122. In FIG. 2, the first network node 111 serves the first cell 121, and the second network node 112 serves the second cell 122. Any of the first network node 111, and the second network node 112 may be of different classes, such as, e.g., macro base station (BS), home BS or pico BS, based on transmission power and thereby also cell size. Any of the first network node 111 and the second network node 112 may be directly connected to one or more core networks, which are not depicted in FIG. 2 to simplify the Figure. In some examples, any of the first network node 111, and the second network node 112 may be a distributed node, such as a virtual node in the cloud, and it may perform its functions entirely on the cloud, or partially, in collaboration with a radio network node. In embodiments herein, the first cell 121 may be referred to as a source cell, whereas the second cell 122 may be referred to as a target cell.

A plurality of wireless devices are located in the wireless communication network 100, whereof a wireless device 130, which may also be referred to simply as a device, is depicted in the non-limiting example of FIG. 2. The wireless device 130, e.g., a 5G UE, may be a wireless communication device which may also be known as e.g., a UE, a mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may be comprised within the wireless communications network 100.

The first network node 111 may be configured to communicate in the wireless communications network 100 with the wireless device 130 over a first communication link 141, e.g., a radio link. The second network node 112 may be configured to communicate in the wireless communications network 100 with the wireless device 130 over a second communication link 142, e.g., a radio link. The first network node 111 may be configured to communicate in the wireless communications network 100 with the second network node 112 over a third communication link 143, e.g., a radio link or a wired link, although communication over more links may be possible.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments. Some embodiments herein will also be further described with some non-limiting examples. In the following description, any reference to a/the source may be understood to equally refer the first network node 111; and any reference to a/the target may be understood to equally refer the second network node 112; any reference to a/the source cell may be understood to equally refer the first cell 121; any reference to a/the target cell may be understood to equally refer the second cell 122.

More specifically, the following are embodiments related to a network node, such as the first network node 111, e.g., a first gNB, and embodiments related to a wireless device, such as the wireless device 130, e.g., a 5G UE.

Embodiments of a method, performed by the first network node 111 will now be described with reference to the flowchart depicted in FIG. 3. The method may be understood to be for handling a link switch by the wireless device 130, from a source link, e.g., the first communication link 141, to a target link, e.g., the second communication link 142. The first network node 111 and the wireless device 130 operate in the wireless communications network 100.

Several embodiments are comprised herein. In some embodiments all the actions may be performed. In some embodiments, some actions may be performed. One or more embodiments may be combined, where applicable. All possible combinations are not described to simplify the description. In FIG. 3, optional actions are indicated with dashed lines. Some actions may be performed in a different order than that shown in FIG. 3. For example, in some examples not depicted in FIG. 3, Action 302 may be performed before Action 301. It should be noted that the examples herein are not mutually exclusive. Components from one embodiment may be tacitly assumed to be present in another embodiment and it will be obvious to a person skilled in the art how those components may be used in the other exemplary embodiments.

As used herein, a link switch, which may also be referred to simply as a switch, may be understood as a switch or change from e.g., a source link, such as the first communication link 141, to a target link, such as the second communication link 142. The link switch may be, e.g., a handover.

Any of the transmitting actions performed by the first network node 111 may be performed to the wireless device 130.

Any of the obtaining actions performed by the first network node 111 may be performed by, e.g., receiving from the wireless device 130.

Action 301

In the course of operations in the wireless communications network 100, the wireless device 130 may be in the coverage area of several target links, e.g., radio links, such as a plurality of cells. The target links may be configured as part of a handover command, e.g., RRCConnectionReconfiguration message sent from the first cell 121. In some situations, more than one of the target links may fulfil a respective condition to switch from the source link to the target link. The respective condition may be understood as e.g., threshold criterion that may be configured in the conditional handover command. The condition may be understood to be respective in that it may apply to one of the plurality of target links. That is, each target link in the plurality of target links may have, or be associated with, its respective condition.

In this Action 301, the first network node 111 transmits, to the wireless device 130, a first indication. The first indication indicates to select, out of a plurality of target links simultaneously fulfilling a respective condition to switch from the source link to the target link, a first target link to switch from the source link to the selected first target link. The selecting is based on at least one of: an RSRP value, an RSRQ value, a SINR value, a priority, RACH resources, a cell in which latest measurements were made, or a frequency, of the respective target links in the plurality of target links. That is, the first indication may be understood to indicate to select, out of the plurality of target links simultaneously fulfilling the respective condition to switch from the source link to the target link, one target link.

Transmitting may be understood as sending, or providing, e.g., via the first communication link 141.

In some embodiments, the first indication may be comprised in an RRCConnectionReconfiguration message.

The first indication may be comprised in an information element.

For example, the information element may be a mobilityControlInfo information element.

In some embodiments, the first indication may indicate that the first target link is to be selected as having at least one of: a) a strongest RSRP value; b) a strongest RSRQ value; c) a strongest SINR value; d) a highest priority; e) allocated RACH resources which are first occurring in time; f) a cell in which the wireless device 130 performed latest measurement; g) an intra-frequency; h) an inter-frequency; or i) fulfilled a condition based on a combination of any of a-h.

In one example of a first group of embodiments, the RRCConnectionReconfiguration message with mobilityControlInfo of the serving cell, e.g., the first cell 121, may include the method, that is, one or more of the RSRP, the RSRQ, the SINR, the priority based/last measured based/nearest available RACH resource based etc. to be used in order to select the cell towards which the wireless device 130 may be required to perform handover execution when more than one of the target cells included in the RRCConnectionReconfiguration message may fulfil the condition configured in the RRCConnectionReconfiguration message.

The respective condition may be transmitted by the first network node 111 in another indication. The another indication may indicate that the wireless device 130 is to perform a link switch responsive to fulfilment of the respective condition. The another indication may indicate a first configuration of the target link, e.g., the second communication link 142, relative to a second configuration of the source link, e.g., the first communication link 141.

By transmitting the first indication in this Action 301, the first network node 111 may provide the wireless device 130 with guidance on which target cell to choose in the scenario when more than one target cell, e.g., for which the RRCConnectionReconfiguration may be available, may fulfil the threshold criterion that may be configured in a conditional handover command, so that it may be clear to the wireless device 130 which cell to choose for handover execution.

Action 302

The plurality of target links may be understood to simultaneously fulfil the respective condition to switch from the source link to the target link at a certain point in time, e.g., a first time period. However, this situation may be understood to change over time, e.g., because of changes in the radio conditions, interference, mobility of the wireless device 130, etc . . . For example, in another time period, referred to herein as a second time period, none of the plurality of target links may fulfil the respective condition to switch from the source link to the target link. The second time period may be understood to precede or succeed the first time period. In order to address this potential situation, in this Action 302, the first network node 111 may transmit yet another indication. This other indication in this Action 302 is one of several indications described herein, which may comprise the first indication described in Action 301, and a second indication and a fourth indication described in subsequent Actions. The another indication in this Action 302 may be referred to herein as a third indication. The third indication may indicate whether or not, if, during the second time period the respective condition to switch from the source link to the target link remains unfulfilled by all of the target links in the plurality of target links after one of: i) a value based on expiration of a timer, and ii) receipt of a number of out of synchronization messages, the wireless device 130 is to: a) refrain from declaring radio link failure (RLF), and b) switch from the source link to a second target link selected from the plurality of target links. In other words, the third indication may indicate whether or not the wireless device 130 is to: a) refrain from declaring radio link failure (RLF), and b) switch from the source link to a second target link selected from the plurality of target links, if, during the second time period, the respective condition remains unfulfilled by all of the target links. This may be based on the respective condition remaining unfulfilled by all of the target links after the value based on the expiration of the timer, or the receipt of the number of out of synchronization messages.

The timer may be, e.g., a T310 timer.

Transmitting may be understood as sending, or providing, e.g., via the first communication link 141.

In some examples of a second group of embodiments, the network, e.g., the first network node 111, may indicate if the wireless device 130 may initiate the handover execution when the Out-Of-Sync related counter or timer may be running or satisfy a certain criterion. This condition may be in conjunction with the other condition or conditions, such as an A3 event triggering condition, to know when to execute the handover.

In one example of the second group of embodiments, the wireless device 130 may be required to trigger the handover execution to one of the target cells in the conditional handover message upon T310 expiry rather than declaring RLF.

In another example of the second group of embodiments, the wireless device 130 may be required to trigger the handover execution to one of the target cells in the conditional handover message upon 'X' successive Out-Of-Sync message from the lower layer, and the value of 'X' may be either configured by the serving cell, e.g., the first cell 121, or fixed in the specification or up to UE implementation, that is the implementation of the wireless device 130.

In another example of the second group of embodiments, the wireless device 130 may be required to trigger the handover execution to one of the target cells in the conditional handover message upon T310 timer which may be running reaches X % of its configured value, and the value of 'X' may be either configured by the serving cell, e.g., the first cell 121, or fixed in the specification, or up to UE implementation, that is the implementation of the wireless device 130.

By transmitting the third indication in this Action 302, the first network node 111 may provide the wireless device 130 with guidance on which target cell to choose in the scenario when the conditions, e.g., as configured in the conditional handover command, are never fulfilled, but the T310 timer running at the wireless device 130 expires, so that the wireless device 130 may avoid declaring RLF, and therefore a bad KPI, and so that the wireless device 130 may know which to perform the re-establishment to.

Action 303

In this Action 303, the first network node 111 may transmit yet a further indication, referred to herein as a fourth indication. The fourth indication may indicate a time period, e.g., a third time period, to be waited prior to initiating the switch from the source link to the selected second target link.

Transmitting may be understood as sending, or providing, e.g., via the first communication link 141.

By transmitting the fourth indication in this Action 302, the first network node 111 may assist the wireless device 130 to avoid having a too early link switch to the target link when the radio conditions may have changed due to large fast fading variations.

Action 304

When the wireless device 130 may perform such an RLF avoidance, the network, e.g., the first network node 111, may benefit from knowing that the wireless device 130 was in an RLF probable region, so that it may for example, adjust one or more of the respective conditions. This may be achieved by having a reporting mechanism wherein the wireless device 130 may be required to report, to the cell in which it may be planning to perform handover execution, that the 'potential-RLF related report' may be available.

According to the foregoing, in this Action 304, the first network node 111 may obtain, from the wireless device 130, a second indication. The second indication may indicate a probability of radio link failure, e.g., of the source link or of the target link.

Obtaining may be understood as e.g., receiving, e.g., via the first link 141.

The second indication, that is, the 'potential-RLF related report' report may be of a similar type to the 'RLF report' in LTE. The following text from 3GPP TS 36.331, v. 15.2.0 shows how the RLF-info related information (indication) may be reported at the transmission of RRCConnectionSetupComplete message.

1> set the content of RRCConnectionSetupComplete message as follows:
2> except for NB-IoT:
3> if the UE has radio link failure or handover failure information available in VarRLF-Report and if the RPLMN is included in plmn-IdentityList stored in VarRLF-Report:
4> include rlf-InfoAvailable;

In NR, a similar message may be used, but the second indication may be that the report is for 'possible RLF' rather than RLF itself. The content of such a report may include the RSRP values, such as those of the original serving cell, one or more, or all of the cells which may be included in the conditional handover command, at the time of starting the handover execution, the relative difference between the configured threshold and/or offset in the conditional handover command, and the experienced measurement values, time difference from the time of reception of the conditional handover command and the time of executing the handover command, etc.

In some examples, the transmitting 303 of the third indication may be based on the obtained second indication.

In some embodiments, the transmitting 301 of the first indication may be performed together with the transmitting, in Action 302, of the third indication and the transmitting, in Action 303, of the fourth indication.

Action 305

In this Action 305, the first network node 111 handles the link switch from the source link to the target link, based on the transmitted first indication.

Handling may be understood as e.g., processing. For example, the first network node 111, upon reception of a message from the second network node 112 that handover has been completed, may release the resources it may have allocated to the first communication link 141 in order not to waste resources by allocating resource to a device that has performed handover to another cell.

It may be noted here that the first network node 111 handles the link switch from the source link to the target link, and not the "selected first target link". This is expressed in this manner to indicate that the actual target link that may be then chosen by the wireless device 130 to switch to from the source link, based on the first indication, may not be explicitly indicated in the first indication, but only the criterion/a on how to select it.

Combinations of the above mentioned embodiments and/or examples may also be considered as possible embodiments.

Embodiments of a method, performed by the wireless device 130, will now be described with reference to the flowchart depicted in FIG. 4. The method may be understood to be for handling the link switch from the source link, such as the first communication link 141, to the target link, such as the second communication link 142. The wireless device 130 operates in the wireless communications network 100.

Several embodiments are comprised herein. In some embodiments all the actions may be performed. In some embodiments, one or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 4, optional actions are indicated with dashed lines. Some actions may be performed in a different order than that shown in FIG. 4.

The detailed description of some of the following corresponds to the same references provided above, in relation to the actions described for the first network node 111, and will thus not be repeated here to simplify the description. For example, in some embodiments, transmitting may be understood as sending, or providing, e.g., via the first communication link 141.

Any of the transmitting actions performed by the wireless device 130 may be performed to the first network node 111, unless otherwise noted.

Any of the obtaining actions performed by wireless device 130 the may be performed by, e.g., receiving from the first network node 111, unless otherwise noted.

Action 401

In this Action 401, the wireless device 130 may obtain the first indication. The first indication indicates to select, out of the plurality of target links simultaneously fulfilling the respective condition to switch from the source link to the target link, the first target link to switch from the source link to the selected first target link. The selecting is based on at least one of: the RSRP value, the RSRQ value, the SINR value, the priority, the RACH resources, the cell in which latest measurements were made, or the frequency, of the respective target links in the plurality of target links.

In some embodiments, the first indication may be obtained from the first network node 111 operating in the wireless communications network 100.

In some embodiments, the first indication may be comprised in the RRCConnectionReconfiguration message.

The first indication may be comprised in the information element.

In some embodiments, the information element may be a mobilityControlInfo information element.

The first indication may be obtained in this Action 401 by, e.g., receiving it from the first network node 111 operating in the wireless communications network 100, e.g., via the first communication link 141, or it may be obtained by e.g., retrieving it from a memory in the wireless device 130, or otherwise obtaining it from another node in the wireless communications network 130.

In one example of a first group of embodiments, the RRCConnectionReconfiguration message with mobilityControlInfo the serving cell may include the method, that is, one or more of the RSRP, the RSRQ, the SINR, the priority based/last measured based/nearest available RACH resource based etc. to be used in order to select the cell towards which the wireless device 130 may be required to perform handover execution when more than one of the target cells included in the RRCConnectionReconfiguration message may fulfill the condition configured in the RRCConnectionReconfiguration message.

In another example of the first group of embodiments, the standard may mandate the method, that is, one or more of Reference Signal Received Power (RSRP), Reference Signal Received Quality (RSRQ), Signal to Interference and noise ratio (SINR), priority based/last measured based/nearest available RACH resource based etc., to be used in order to select the cell towards which the wireless device 130 may be required to perform handover execution when more than one of the target cells included in the RRCConnectionReconfiguration message may fulfill the condition configured in the RRCConnectionReconfiguration message.

In another example of the first group of embodiments, the wireless device 130 may implement proprietarily the method, that is, one or more of RSRP/RSRQ/SINR/priority based/last measured based/nearest available RACH resource based etc., to be used in order to select the cell towards which the wireless device 130 may be required to perform handover execution when more than one of the target cells included in the RRCConnectionReconfiguration message may fulfill the condition configured in the RRCConnectionReconfiguration message.

In some embodiments, the first indication may indicate that the first target link is to be selected as having at least one of: a) the strongest RSRP value; b) the strongest RSRQ value; c) the strongest SINR value; d) the highest priority; e) the allocated RACH resources which are first occurring in time; f) the cell in which the wireless device 130 performed the latest measurement; g) the intra-frequency; h) the inter-frequency; or i) fulfilled the condition based on the combination of any of a-h.

The respective condition may be obtained from the first network node 111 operating in the wireless communications network 100, in another indication. The first indication may indicate that the wireless device 130 is to perform the link switch responsive to fulfilment of the respective condition. The another indication may indicate the first configuration of the target link relative to the second configuration of the source link.

Action 402

In this Action 402, the wireless device 130 may obtain, from the first network node 111 operating in the wireless communications network 100, the third indication. The third indication may indicate whether or not, if, during the second time period, the respective condition to switch from the source link to the target link remains unfulfilled by all of the target links in the plurality of target links after one of: i) the value based on expiration of the timer and ii) receipt of the number of out of synchronization messages, the wireless device 130 is to: a) refrain from declaring radio link failure, and b) switch from the source link to a second target link selected from the plurality of target links.

In embodiments wherein this Action 402 may be performed, the link switch may be based on the third indication.

The timer may be the T310 timer.

The obtaining in this Action 402 may be understood as receiving via, e.g., the first communication link 141.

Action 403

In this Action 403, the wireless device 130 may obtain, from the first network node 111 the fourth indication. The fourth indication may indicate the (third) time period to be waited prior to initiating the link switch from the source link to the selected second target link.

In embodiments wherein this Action 403 may be performed, the link switch may be based on the fourth indication.

In some embodiments, the obtaining in Action 401 of the first indication may be performed together with the obtaining in Action 402 of the third indication and the obtaining in Action 403 of the fourth indication.

The obtaining in this Action 403 may be understood as receiving via, e.g., the first communication link 141.

Action 404

In this Action 404, the wireless device 130 may transmit, to the first network node 111 operating in the wireless communications network 100, the second indication. The second indication may indicate the probability of radio link failure.

That is, via the second indication, the wireless device 130 may report RLF avoidance related information to the first network node 111.

The transmitting in this Action 404 may be performed via, e.g., the first communication link 141.

In some embodiments, the obtaining in Action 403 of the third indication may be based on the transmitted second indication.

Action 405

In this Action 405, the wireless device 130 may select the first target link based on the first indication. The link switch may then be executed based on the selected first target link.

The first indication used in the selecting in this Action 405 may be the obtained first indication, or it may be obtained by e.g., retrieving it from a memory in the wireless device 130, or otherwise obtaining it from another node in the wireless communications network 100.

Action 406

In this Action 406, the wireless device 130 may refrain from declaring RLF based on at least one of: the third indication or the fourth indication.

To refrain may be understood as to avoid, that is to not declare RLF.

Action 407

In this Action 407, the wireless device 130 executes the link switch from the source link to the target link, based on the obtained first indication.

Executing the link switch in this Action 407 may comprise, e.g., detaching from the first network node 111 and synchronizing with the second network node 112, sending an RRCReconfigurationComplete message to the second network node 112 to confirm that the link switch has been completed etc . . . .

Figure 5:
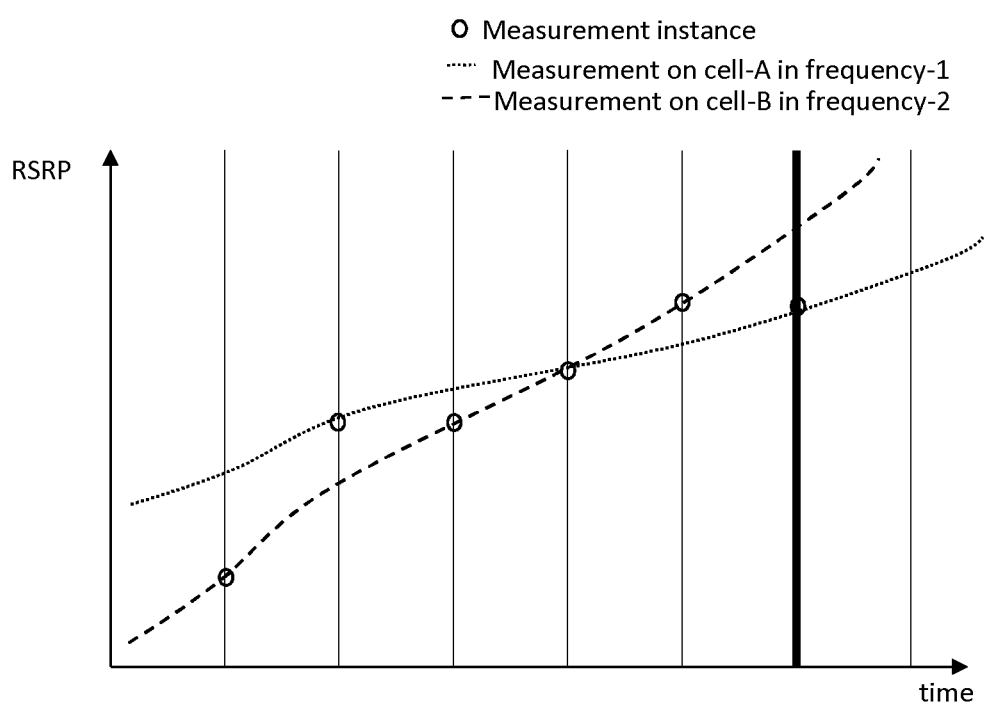
FIG. 5 is a schematic diagram illustrating an example of UE measurements, according to embodiments herein.

A non-limiting example of embodiments herein is presented in the schematic diagram of FIG. 5, which is used to provide further explanation for the scenario of selecting, according to examples of Action 405, the cell towards which the wireless device 130 may have performed the latest measurement. When the wireless device 130 may perform inter-frequency measurements, the wireless device 130 may require measurement gaps, as the wireless device 130 may be unable to perform simultaneous measurements on different frequencies. When there may be multiple inter-frequency neighbors' related measurements configured, the wireless device 130 may not perform measurements on cells, that is, frequencies, for which the RRCConnectionReconfiguration may be provided in the conditional handover command. In the example shown in FIG. 5, the wireless device 130 may perform measurements on frequency-1 and frequency-2 alternatively, and for the samples in between the measurements, the wireless device 130 may use interpolation to estimate the missing measurement value. At the measurement instance which is shown with bold vertical line, the measurement is performed on frequency-1 for cell-A and the so performed measurement and the interpolation-based measurement from frequency-2 for cell-B fulfil the condition(s) as configured in the conditional handover command for both these cells. In such a scenario, involving different frequencies, the wireless device 130 may prioritize the cell in the frequency in which it has performed the latest actual measurement, which in the example is frequency 1, for handover execution. It may be noted that if there are different cells in frequency-1 that satisfy the conditions as configured in the conditional handover command, then the wireless device 130 may choose the cell towards which it may perform the handover execution based on either RSRP/RSRQ/SINR and/or priority schemes as mentioned before.

Certain embodiments disclosed herein may provide one or more of the following technical advantage(s), which may be summarized as follows. Based on the embodiments herein addressing the first problem, the behavior of the wireless device 130 at the time of the plurality of target links satisfying the conditions simultaneously is resolved.

Based on the embodiments herein addressing the second problem, the network may reduce the RLF KPI and the wireless device 130 may perform handover successfully instead of waiting for the RLF related timer to expire.

Figure 6:
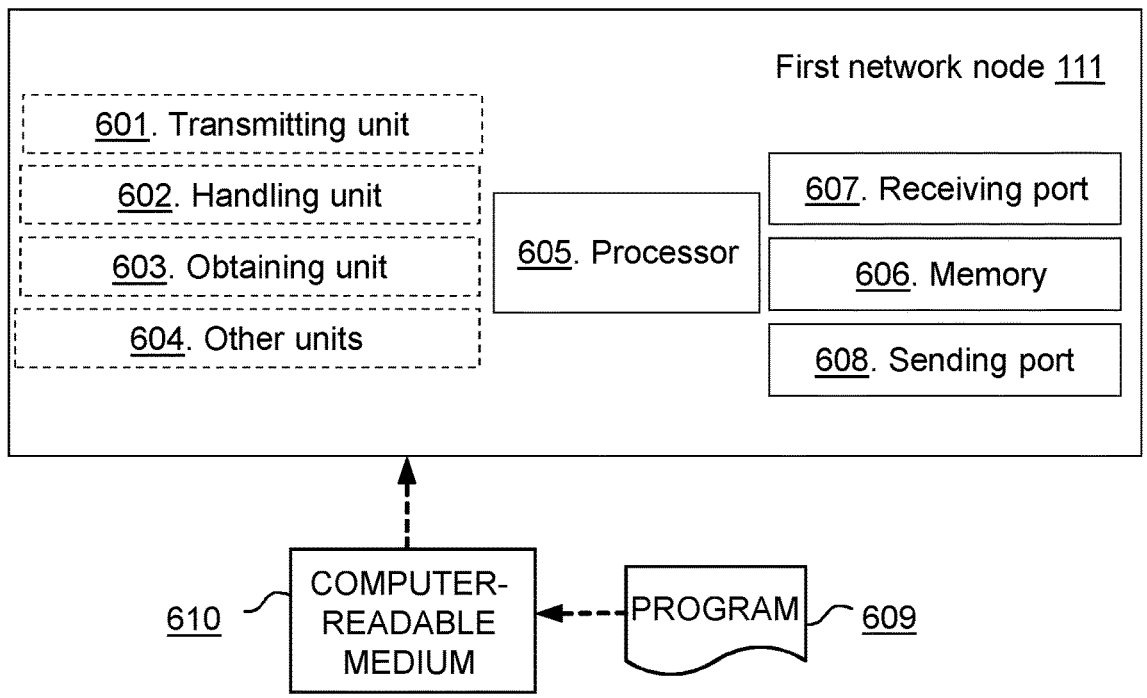
FIG. 6 is a schematic block diagram illustrating two non-limiting examples, a) and b), of a first network node, according to embodiments herein.
Figure 6:
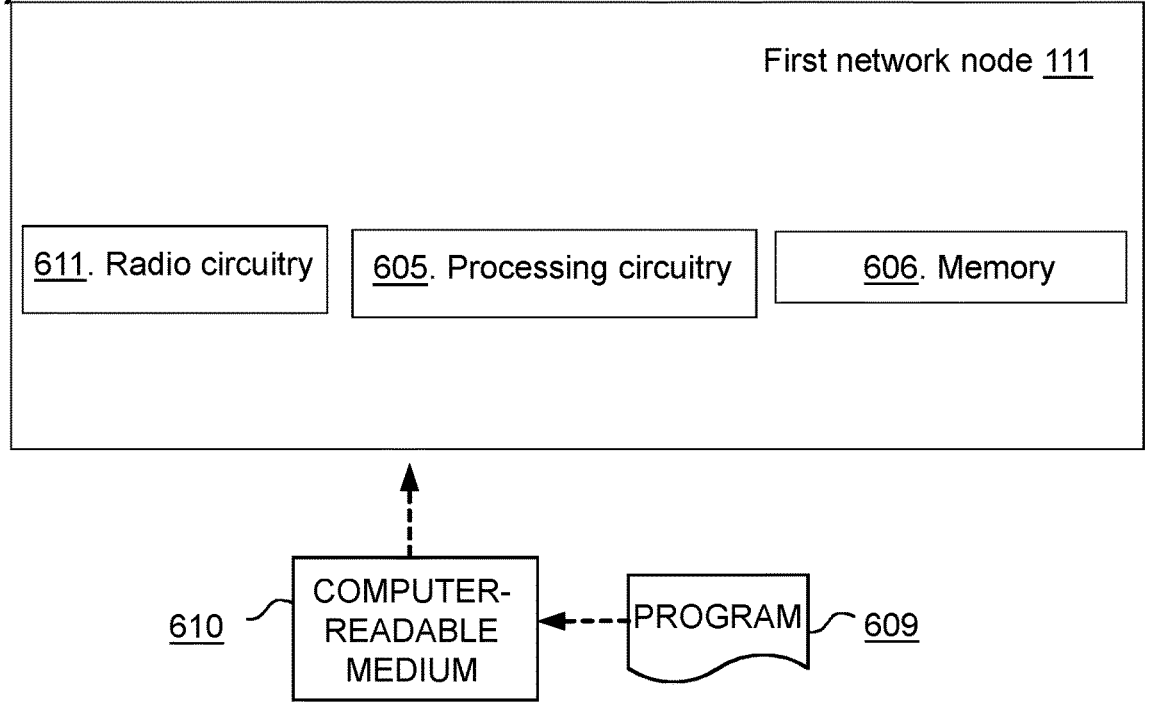

FIG. 6 depicts two different examples in panels a) and b), respectively, of the arrangement that the first network node 111 may comprise. In some embodiments, the first network node 111 may comprise the following arrangement depicted in FIG. 6a.

The first network node 111 may be understood to be for handling the link switch by the wireless device 130 from the source link to the target link. The first network node 111 and the wireless device 130 are configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 6, optional units are indicated with dashed boxes.

The detailed description of some of the following corresponds to the same references provided above, in relation to the actions described for the first network node 111, and will thus not be repeated here. For example, in some embodiments, to transmit may be understood as to send, or provide.

The first network node 111 is configured to perform the transmitting of Action 301, e.g. by means of a transmitting unit 601 within the first network node 111, configured to, transmit, to the wireless device 130, a first indication; the first indication is configured to indicate to select, out of the plurality of target links simultaneously fulfilling the respective condition to switch from the source link to the target link, the first target link to switch from the source link to the selected first target link. The selecting is configured to be based on at least one of: the RSRP value, the RSRQ value, the SINR value, the priority, the RACH resources, the cell in which latest measurements were made, or the frequency, of the respective target links in the plurality of target links. The transmitting unit 601 may be a processor 605 of the first network node 111, or an application running on such processor.

The first network node 111 is also configured to perform the handling of Action 305, e.g., by means of a handling unit 602 within the first network node 111, configured to, handle the link switch from the source link to the target link, based on the transmitted first indication. The handling unit 602 may be a processor 605 of the first network node 111, or an application running on such processor.

In some embodiments, the first indication may be configured to be comprised in the RRCConnectionReconfiguration message.

In some embodiments, the first indication may be configured to be comprised in the information element.

The information element may be configured to be the mobilityControlInfo information element.

In some embodiments, the first indication may be configured to indicate that the first target link is to be selected as having at least one of: a) the strongest RSRP value; b) the strongest RSRQ value; c) the strongest SINR value; d) the highest priority; e) the allocated RACH resources which are first occurring in time; f) the cell in which the wireless device 130 performed a latest measurement; g) the intra-frequency; h) the inter-frequency; or i) fulfilled the condition based on the combination of any of a-h.

In some embodiments, the respective condition may be configured to be transmitted by the first network node 111 in another indication. The first indication may be configured to indicate that the wireless device 130 is to perform the link switch responsive to fulfilment of the respective condition. The another indication may be configured to indicate the first configuration of the target link relative to the second configuration of the source link.

In some embodiments, the first network node 111 may be further configured to perform the obtaining of Action 304, e.g., by means of an obtaining unit 603 within the first network node 111, configured to, obtain, from the wireless device 130, the second indication. The second indication may be configured to indicate the probability of radio link failure. The obtaining unit 603 may be the processor 605 of the first network node 111, or an application running on such processor.

In some embodiments, the first network node 111 may be further configured to perform the transmitting of Action 302, e.g. by means of the transmitting unit 601, configured to, transmit the third indication. The third indication may be configured to indicate whether or not, if, during the second time period, the respective condition to switch from the source link to the target link remains unfulfilled by all of the target links in the plurality of target links after one of: i) the value based on expiration of the timer and ii) the receipt of the number of out of synchronization messages, the wireless device 130 is to: a) refrain from declaring radio link failure, and b) switch from the source link to the second target link selected from the plurality of target links.

In some embodiments, the first network node 111 may be further configured to perform the transmitting of Action 303, e.g., by means of the transmitting unit 601, configured to, transmit the fourth indication, the fourth indication being configured to indicate the (third) time period to be waited prior to initiating the switch from the source link to the selected second target link.

In some embodiments, to transmit the first indication may be configured to be performed together with the transmitting of the third indication and the transmitting of the fourth indication.

In some embodiments, the timer may be configured to be the T310 timer.

Other units 604 may be comprised in the first network node 111.

The embodiments herein in the first network node 111 may be implemented through one or more processors, such as a processor 605 in the first network node 111 depicted in FIG. 6a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 606 comprising one or more memory units. The memory 606 is arranged to be used to store obtained information, store data, configurations, schedulings, and applications etc. to perform the methods herein when being executed in the first network node 111.

In some embodiments, the first network node 111 may receive information from, e.g., the second network node 112, or the wireless device 130, through a receiving port 607. In some embodiments, the receiving port 607 may be, for example, connected to one or more antennas in first network node 111. In other embodiments, the first network node 111 may receive information from another structure in the wireless communications network 100 through the receiving port 607. Since the receiving port 607 may be in communication with the processor 605, the receiving port 607 may then send the received information to the processor 605. The receiving port 607 may also be configured to receive other information.

The processor 605 in the first network node 111 may be further configured to transmit or send information to e.g., the second network node 112, or the wireless device 130, or another structure in the wireless communications network 100, through a sending port 608, which may be in communication with the processor 605, and the memory 606.

Those skilled in the art will also appreciate that the transmitting unit 601, the handling unit 602, the obtaining unit 603, and the other units 604 described above may refer to a combination of analog and digital circuits, and/or one or more processors configured with software and/or firmware, e.g., stored in memory, that, when executed by the one or more processors such as the processor 605, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 601-604 described above may be implemented as one or more applications running on one or more processors such as the processor 605.

Thus, the methods according to the embodiments described herein for the first network node 111 may be respectively implemented by means of a computer program 609 product, comprising instructions, i.e., software code portions, which, when executed on at least one processor 605, cause the at least one processor 605 to carry out the actions described herein, as performed by the first network node 111. The computer program 609 product may be stored on a computer-readable storage medium 610. The computer-readable storage medium 610, having stored thereon the computer program 609, may comprise instructions which, when executed on at least one processor 605, cause the at least one processor 605 to carry out the actions described herein, as performed by the first network node 111. In some embodiments, the computer-readable storage medium 610 may be a non-transitory computer-readable storage medium, such as a CD ROM disc, or a memory stick. In other embodiments, the computer program 609 product may be stored on a carrier containing the computer program 609 just described, wherein the carrier is one of an electronic signal, optical signal, radio signal, or the computer-readable storage medium 610, as described above.

The first network node 111 may comprise a communication interface configured to facilitate communications between the first network node 111 and other nodes or devices, e.g., the second network node 112, the wireless device 130, or another structure. The interface may, for example, include a transceiver configured to transmit and receive radio signals over an air interface in accordance with a suitable standard.

In other embodiments, the first network node 111 may comprise the following arrangement depicted in FIG. 6b. The first network node 111 may comprise a processing circuitry 605, e.g., one or more processors such as the processor 605, in the first network node 111 and the memory 606. The first network node 111 may also comprise a radio circuitry 611, which may comprise e.g., the receiving port 607 and the sending port 608. The processing circuitry 605 may be configured to, or operable to, perform the method actions according to FIG. 3 and/or FIGS. 13-17, in a similar manner as that described in relation to FIG. 6a. The radio circuitry 611 may be configured to set up and maintain at least a wireless connection with the first network node 111. Circuitry may be understood herein as a hardware component.

Hence, embodiments herein also relate to the first network node 111 operative to operate in the wireless communications network 100. The first network node 111 may comprise the processing circuitry 605 and the memory 606, said memory 606 containing instructions executable by said processing circuitry 605, whereby the first network node 111 is further operative to perform the actions described herein in relation to the first network node 111, e.g., in FIG. 3, and/or FIGS. 13-17.

Figure 7:
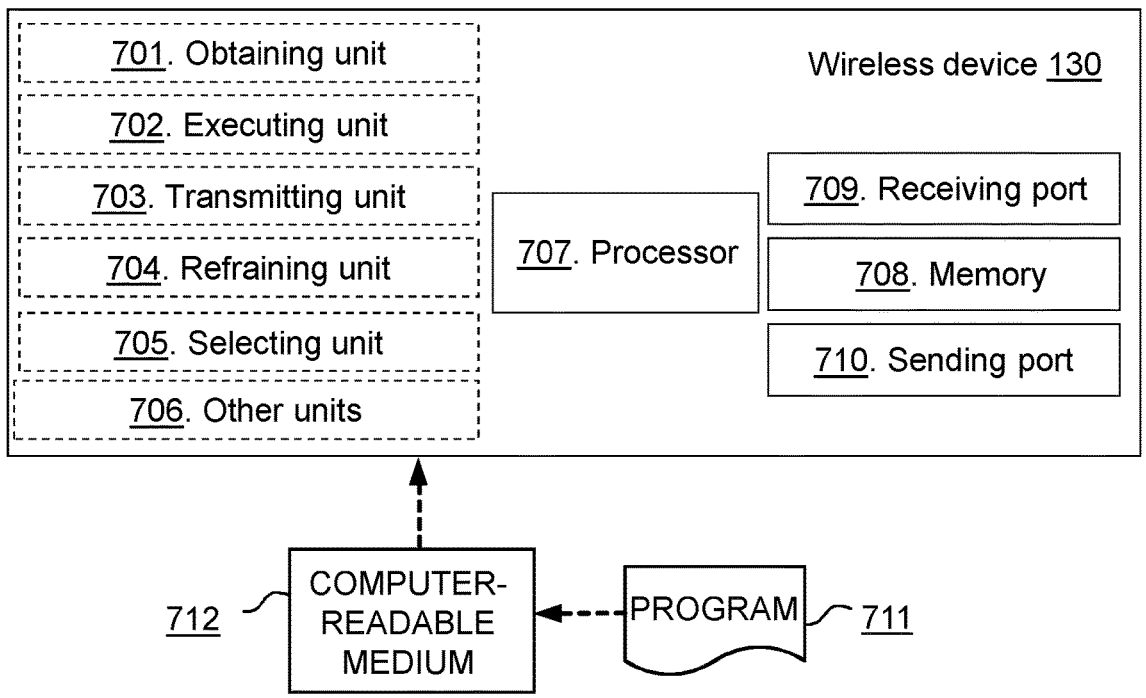
FIG. 7 is a schematic block diagram illustrating two non-limiting examples, a) and b), of a wireless device, according to embodiments herein.
Figure 7:
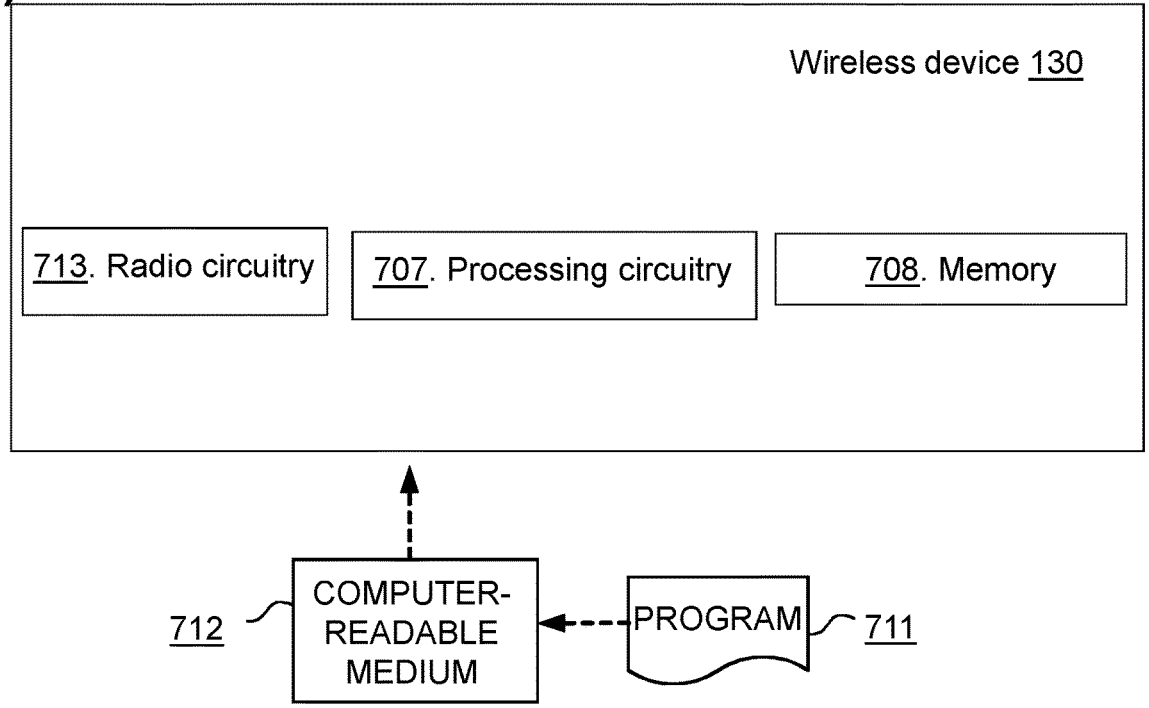

FIG. 7 depicts two different examples in panels a) and b), respectively, of the arrangement that the wireless device 130 may comprise. In some embodiments, the wireless device 130 may comprise the following arrangement depicted in FIG. 7a.

The wireless device 130 may be understood to be for handling the link switch from the source link to the target link. The wireless device 130 is configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 7, optional units are indicated with dashed boxes.

The detailed description of some of the following corresponds to the same references provided above, in relation to the actions described for the wireless device 130, and will thus not be repeated here. For example, in some embodiments, to transmit may be understood as to send, or provide.

The wireless device 130 is configured to perform the obtaining of Action 401, e.g. by means of an obtaining unit 701 within the wireless device 130, configured to, obtain, the first indication. The first indication is configured to indicate to select, out of the plurality of target links simultaneously fulfilling the respective condition to switch from the source link to the target link, the first target link to switch from the source link to the selected first target link. The selecting is configured to be based on at least one of: the RSRP value, the RSRQ, value, the SINR value, the priority, the RACH resources, the cell in which latest measurements were made, or the frequency, of the respective target links in the plurality of target links. The obtaining unit 701 may be the processor 707 of the wireless device 130, or an application running on such processor.

The wireless device 130 is also configured to perform the executing of Action 407, e.g., by means of an executing unit 702 within the wireless device 130, configured to, execute the link switch from the source link to the target link, based on the first indication configured to be obtained. The executing unit 402 may be the processor 707 of the wireless device 130, or an application running on such processor.

In some embodiments, the first indication may be configured to be obtained from the first network node 111 configured to operate in the wireless communications network 100.

In some embodiments, the first indication may be configured to be comprised in the RRCConnectionReconfiguration message.

In some embodiments, the first indication may be configured to be comprised in the information element.

The information element may be configured to be the mobilityControlInfo information element.

In some embodiments, the first indication may be configured to indicate that the first target link is to be selected as having at least one of: a) the strongest RSRP value; b) the strongest RSRQ value; c) the strongest SI NR value; d) the highest priority; e) the allocated RACH resources which are first occurring in time; f) the cell in which the wireless device 130 performed the latest measurement; g) the intra-frequency; h) the inter-frequency; or i) fulfilled the condition based on the combination of any of a-h.

In some embodiments, the respective condition may be configured to be obtained from first network node 111 configured to operate in the wireless communications network 100 in another indication. The first indication may be configured to indicate that the wireless device 130 is to perform the link switch responsive to fulfilment of the respective condition. The another indication may be configured to indicate the first configuration of the target link relative to the second configuration of the source link.

In some embodiments, the wireless device 130 may be further configured to perform the transmitting of Action 402, e.g., by means of a transmitting unit 703 within the wireless device 130, configured to, transmit, to the first network node 111 configured to operate in the wireless communications network 100, the second indication. The second indication is configured to indicate the probability of radio link failure. The transmitting unit 703 may be a processor 707 of the wireless device 130, or an application running on such processor.

In some embodiments, the wireless device 130 may be further configured to perform the obtaining of Action 403, e.g. by means of the obtaining unit 701, configured to, obtain, from the first network node 111 configured to operate in the wireless communications network 100, the third indication. The third indication may be configured to indicate whether or not, if, during the second time period, the respective condition to switch from the source link to the target link remains unfulfilled by all of the target links in the plurality of target links after one of: i) the value based on expiration of the timer and ii) the receipt of the number of out of synchronization messages, the wireless device 130 is to: a) refrain from declaring radio link failure, and b) switch from the source link to the second target link selected from the plurality of target links.

In some embodiments, the wireless device 130 may be further configured to perform the obtaining of Action 404, e.g. by means of the obtaining unit 701, configured to, obtain, from the first network node 111 the fourth indication. The fourth indication may be configured to indicate the time period to be waited prior to initiating the link switch from the source link to the selected second target link.

To obtain the first indication may be configured to be performed together with the obtaining of the third indication and the obtaining of the fourth indication.

In some embodiments, the timer may be configured to be the T310 timer.

In some embodiments, the wireless device 130 may be further configured to perform the refraining of Action 406, e.g., by means of a refraining unit 704 within the wireless device 130, configured to, refrain from declaring RLF based on at least one of: the third indication or the fourth indication. The refraining unit 704 may be a processor 707 of the wireless device 130, or an application running on such processor.

In some embodiments, the wireless device 130 may be further configured to perform the selecting of Action 405, e.g., by means of a selecting unit 705 within the wireless device 130, configured to, select the first target link based on the first indication. The link switch may be configured to be executed based on the selected first target link. The selecting unit 705 may be a processor 707 of the wireless device 130, or an application running on such processor.

Other units 706 may be comprised in the wireless device 130.

The embodiments herein in the wireless device 130 may be implemented through one or more processors, such as a processor 707 in the wireless device 130 depicted in FIG. 7a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 708 comprising one or more memory units. The memory 708 is arranged to be used to store obtained information, store data, configurations, schedulings, and applications etc. to perform the methods herein when being executed in the wireless device 130.

In some embodiments, the wireless device 130 may receive information from, e.g., the second network node 112, or the first network node 111, through a receiving port 709. In some embodiments, the receiving port 709 may be, for example, connected to one or more antennas in wireless device 130. In other embodiments, the wireless device 130 may receive information from another structure in the wireless communications network 100 through the receiving port 709. Since the receiving port 709 may be in communication with the processor 707, the receiving port 709 may then send the received information to the processor 707. The receiving port 709 may also be configured to receive other information.

The processor 707 in the wireless device 130 may be further configured to transmit or send information to e.g., the second network node 112, or the first network node 111, or another structure in the wireless communications network 100, through a sending port 710, which may be in communication with the processor 707, and the memory 708.

Those skilled in the art will also appreciate that the obtaining unit 701, the executing unit 702, the transmitting unit 703, the refraining unit 704, the selecting unit 705, and the other units 706 described above may refer to a combination of analog and digital circuits, and/or one or more processors configured with software and/or firmware, e.g., stored in memory, that, when executed by the one or more processors such as the processor 707, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 701-706 described above may be implemented as one or more applications running on one or more processors such as the processor 707.

Thus, the methods according to the embodiments described herein for the wireless device 130 may be respectively implemented by means of a computer program 711 product, comprising instructions, i.e., software code portions, which, when executed on at least one processor 707, cause the at least one processor 707 to carry out the actions described herein, as performed by the wireless device 130. The computer program 711 product may be stored on a computer-readable storage medium 712. The computer-readable storage medium 712, having stored thereon the computer program 711, may comprise instructions which, when executed on at least one processor 707, cause the at least one processor 707 to carry out the actions described herein, as performed by the wireless device 130. In some embodiments, the computer-readable storage medium 712 may be a non-transitory computer-readable storage medium, such as a CD ROM disc, or a memory stick. In other embodiments, the computer program 711 product may be stored on a carrier containing the computer program 711 just described, wherein the carrier is one of an electronic signal, optical signal, radio signal, or the computer-readable storage medium 712, as described above.

The wireless device 130 may comprise a communication interface configured to facilitate communications between the wireless device 130 and other nodes or devices, e.g., the second network node 112, the first network node 111, or another structure. The interface may, for example, include a transceiver configured to transmit and receive radio signals over an air interface in accordance with a suitable standard.

In other embodiments, the wireless device 130 may comprise the following arrangement depicted in FIG. 7b. The wireless device 130 may comprise a processing circuitry 707, e.g., one or more processors such as the processor 707, in the wireless device 130 and the memory 708. The wireless device 130 may also comprise a radio circuitry 713, which may comprise e.g., the receiving port 709 and the sending port 710. The processing circuitry 707 may be configured to, or operable to, perform the method actions according to FIG. 4, and/or FIGS. 13-17, in a similar manner as that described in relation to FIG. 7a. The radio circuitry 713 may be configured to set up and maintain at least a wireless connection with the wireless device 130. Circuitry may be understood herein as a hardware component.

Hence, embodiments herein also relate to the wireless device 130 operative to operate in the wireless communications network 100. The wireless device 130 may comprise the processing circuitry 707 and the memory 708, said memory 708 containing instructions executable by said processing circuitry 707, whereby the wireless device 130 is further operative to perform the actions described herein in relation to the wireless device 130, e.g., in FIG. 4, and/or FIGS. 13-17.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

Examples Related to Embodiments Herein

Figure 3:
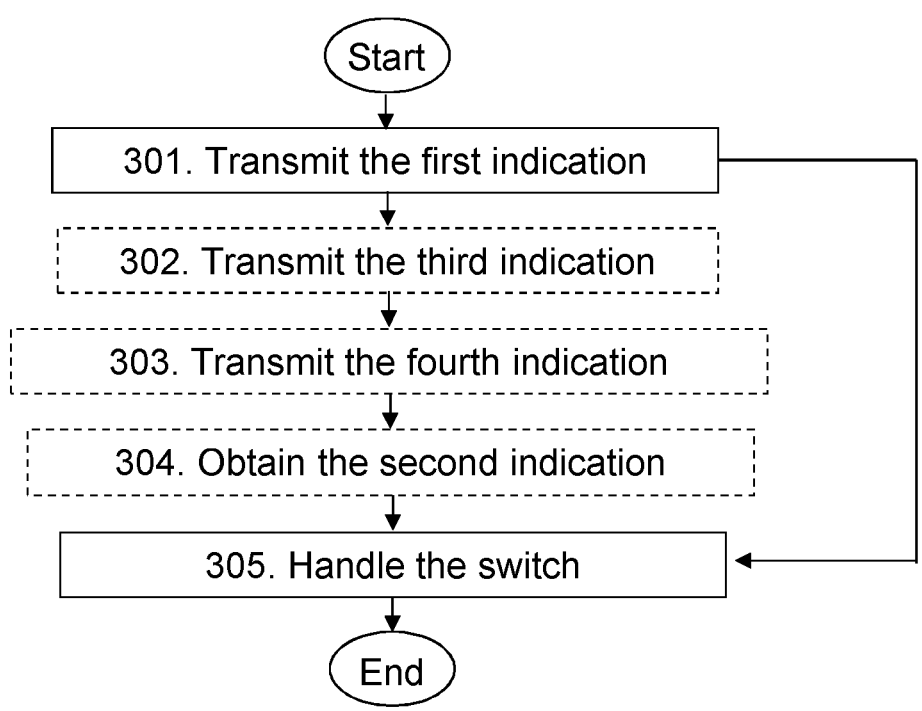
FIG. 3 depicts a flowchart of a method in a first network node, according to embodiments herein.
Figure 8:
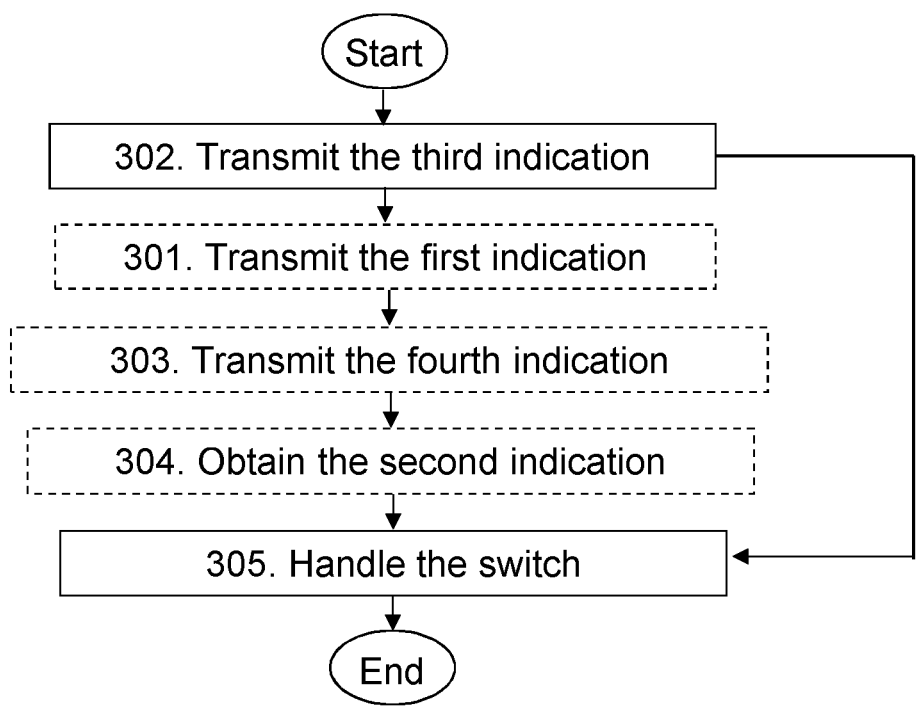
FIG. 8 depicts a flowchart depicting a non-limiting example of a method in a first network node, according to examples related to embodiments herein.

As mentioned earlier, in embodiments of a method, performed by the first network node 111, for handling the link switch by the wireless device 130, from the source link to the target link, some actions may be performed in a different order than that shown in FIG. 3. FIG. 8 depicts a flowchart for such a method. In FIG. 8, optional actions are depicted with dashed lines, e.g., in some examples, Action 301 may not be performed. The description of the actions corresponds to that provided in FIG. 3, and will therefore not be repeated here. The method depicted in FIG. 8 may be performed by a first network node 111 configured, as described in FIG. 6, with the corresponding units to perform the actions depicted in FIG. 8.

Figure 4:
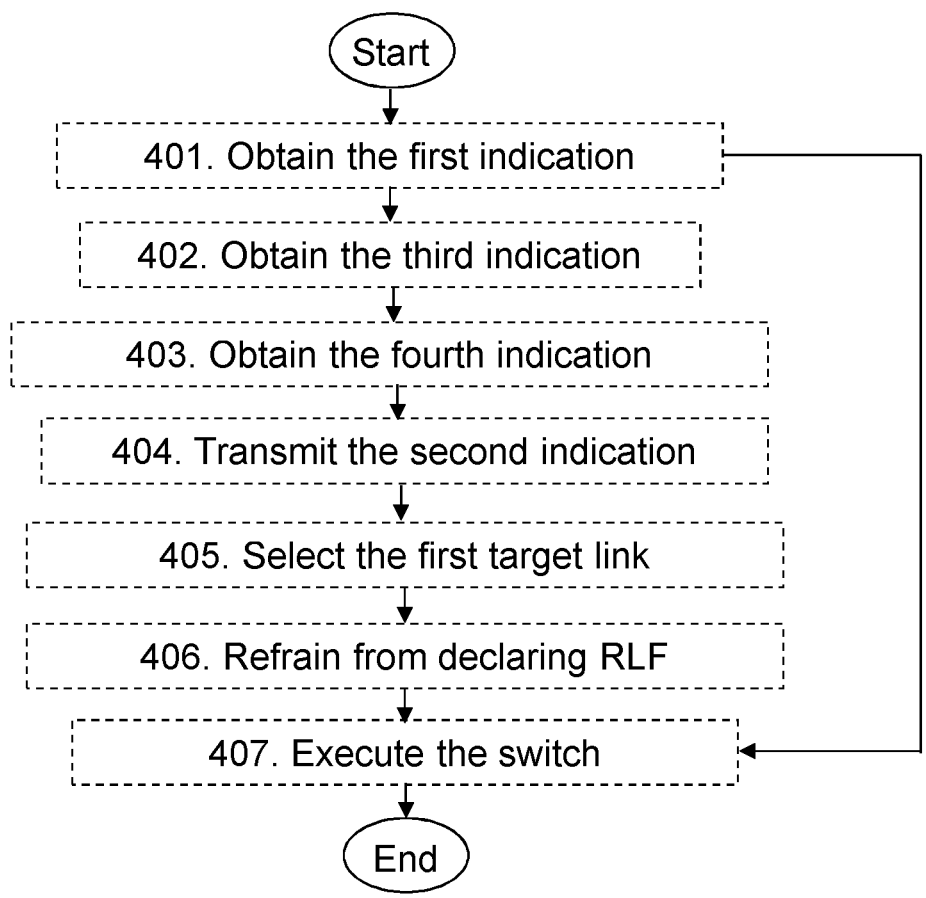
FIG. 4 depicts a flowchart of a method in a wireless device, according to embodiments herein.
Figure 9:
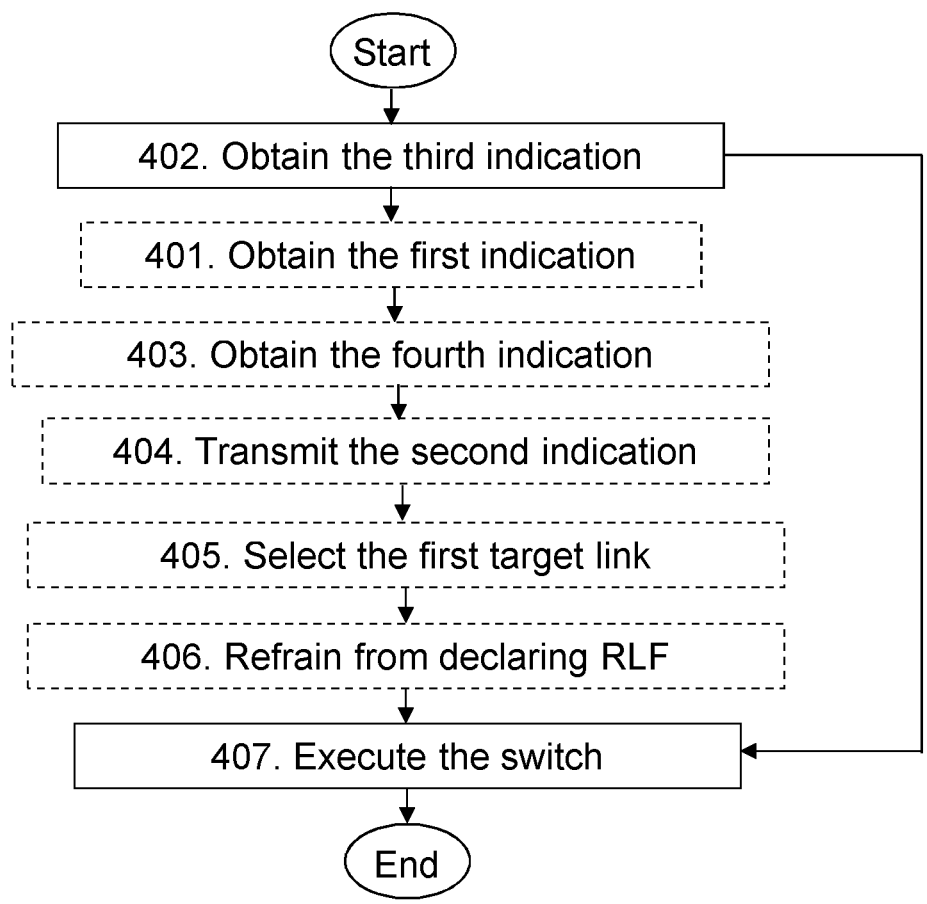
FIG. 9 depicts a flowchart depicting a non-limiting example of a method in a wireless device, according to examples related to embodiments herein.
Figure 10:
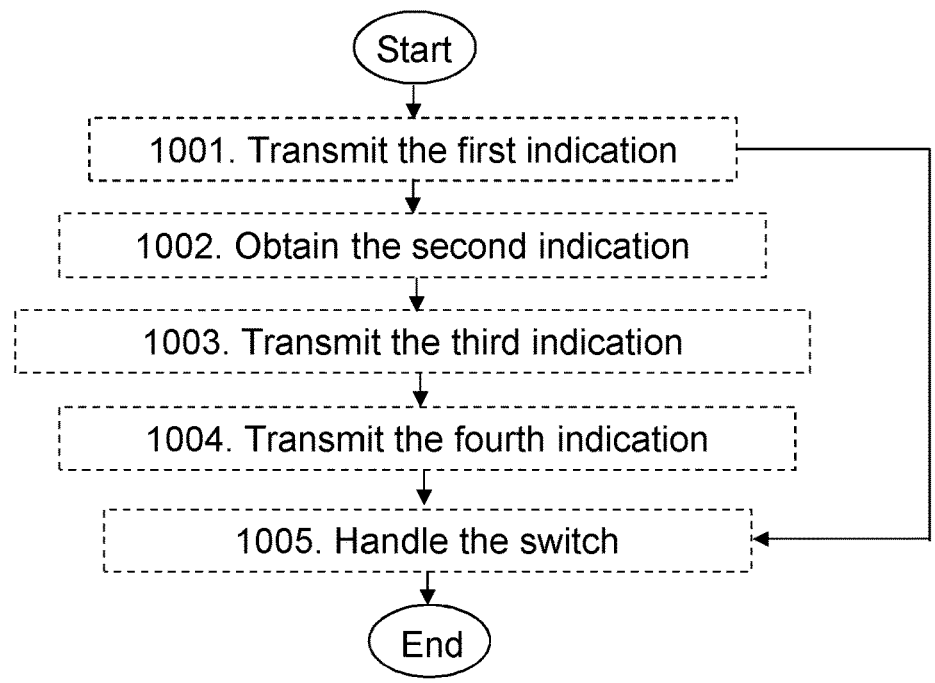
FIG. 10 depicts two flowcharts depicting two non-limiting examples, in panels a) and b), respectively, of a method in a first network node, according to other examples related to embodiments herein.
Figure 10:
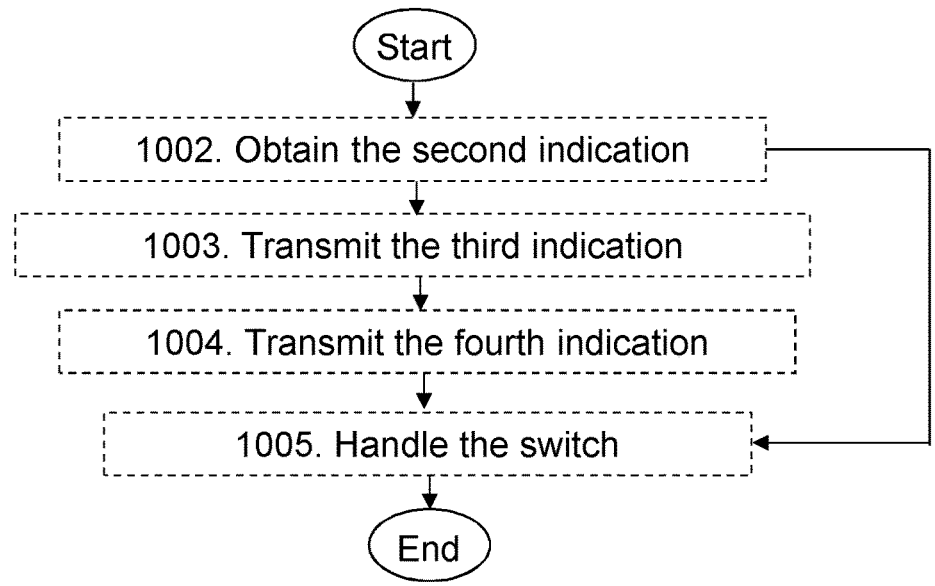
Figure 11:
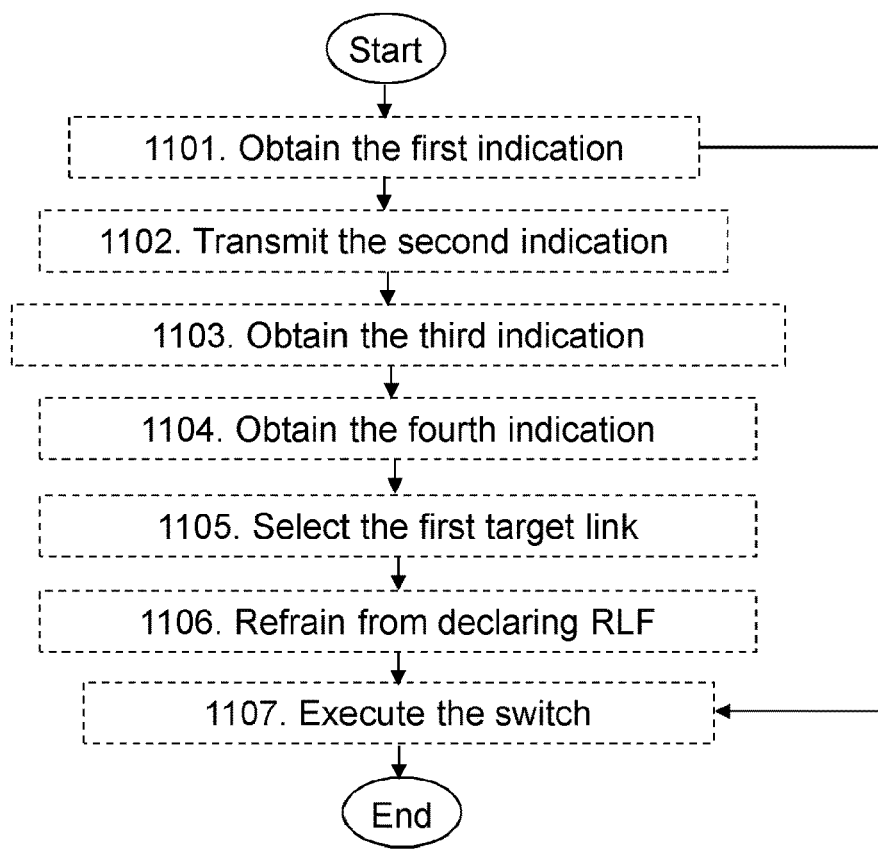
FIG. 11 depicts two flowcharts depicting two non-limiting examples, in panels a) and b), respectively, of a method in a wireless device, according to other examples related to embodiments herein.
Figure 11:
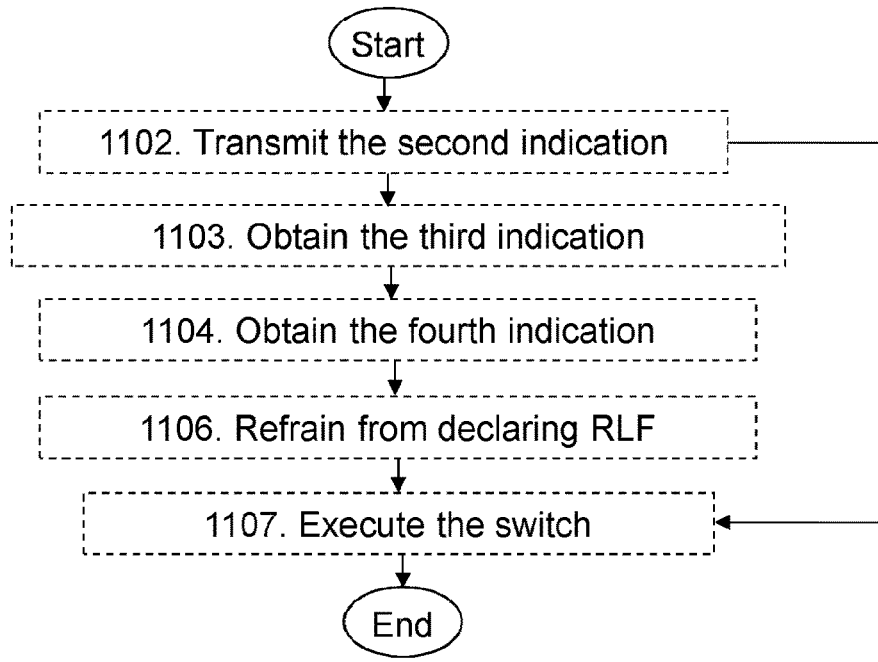

As mentioned earlier, in embodiments of a method, performed by the wireless device 130, for handling the link switch from the source link to the target link, some actions may be performed in a different order than that shown in FIG. 4. FIG. 9 depicts a flowchart for such a method. In FIG. 9, optional actions are depicted with dashed lines, e.g., in some examples, Action 401 may not be performed. The description of the actions corresponds to that provided in FIG. 4, and will therefore not be repeated here. The method depicted in FIG. 9 may be performed by a wireless device 130 configured, as described in FIG. 7, with the corresponding units to perform the actions depicted in FIG. 9.

Some other examples related to embodiments herein will now be described.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a network node, such as the first network node 111, e.g., a first gNB, and embodiments related to a wireless device, such as the wireless device 130, e.g., a 5G UE.

The first network node 111 embodiments relate to FIG. 10, FIG. 6 and FIGS. 12-17.

A method, performed by a network node, such as the first network node 111, is described herein. The method may be understood to be for handling a link switch from a source link, such as the first link 141, to a target link, such as the second link 142. The first network node 111 may be operating in the communications network 100.

The method may comprise one or more of the following actions.

In some embodiments all the actions may be performed. One or more embodiments may be combined, where applicable. All possible combinations are not described to simplify the description. A first non-limiting combination is depicted in panel a) of FIG. 10. A second non-limiting combination is depicted in panel b) of FIG. 10. Some actions may be performed in a different order than that shown in FIG. 10.

As used herein, a link switch, which may also be referred to simply as a switch, may be understood as a switch or change from e.g., a source link, such as the first link 141, to a target link, such as the second link 142.

Transmitting 1001, to the wireless device 130 operating in the wireless communications network 100, a first indication; the first indication may indicate to select, out of a plurality of target links simultaneously fulfilling a respective condition to switch from the source link to the target link, a first target link to switch from the source link to the selected first target link; the selecting may be based on at least one of: a Reference Signal Received Power (RSRP) value, a Reference Signal Received Quality (RSRQ) value, a Signal to Interference and noise ratio (SINR) value, a priority, Random Access Channel (RACH) resources, a cell in which latest measurements were made, or a frequency, of the target links in the plurality of target links. The first network node 111 may be configured to perform this transmitting 1001 action, e.g. by means of a transmitting unit 601 within the first network node 111, configured to perform this action. The transmitting unit 601 may be a processor 605 of the first network node 111, or an application running on such processor.

Transmitting may be understood as sending, or providing, e.g., via the first link 141.

In some embodiments, the first indication may be comprised in an RRCConnectionReconfiguration message.

The first indication may be comprised in an information element.

For example, the information element may be a mobilityControlInfo information element.

In some embodiments, the first indication may indicate that the first target link is to be selected as having at least one of: a) a strongest RSRP value; b) a strongest RSRQ value; c. a strongest SINR value; d) a highest priority; e) allocated RACH resources which are first occurring in time; f) a cell in which the wireless device 130 performed latest measurement; g) an intra-frequency; h) an inter-frequency; or i) fulfilled a condition based on a combination of any of a-h.

The respective condition may be transmitted by the first network node 111 in another indication; the another indication may indicate that the wireless device 130 is to perform a link switch responsive to fulfilment of the respective condition; the another indication may indicate a first configuration of the target link relative to a second configuration of the source link.

In some embodiments, the method may further comprise one or more of the following actions:

Handling 1005 the link switch from the source link to the target link, based on the transmitted first indication. The first network node 111 may be configured to perform this handling action 1005, e.g. by means of a handling unit 602, configured to perform this action. The handling unit 602 may be a processor 605 of the first network node 111, or an application running on such processor.

Handling may be understood as e.g., processing.

Obtaining 1002, e.g., from the wireless device 130, a second indication; the second indication may indicate a probability of radio link failure, e.g., of the source link or of the target link. The first network node 111 may be configured to perform this obtaining action 1002, e.g., by means of an obtaining unit 603 within the first network node 111, configured to perform this action. The obtaining unit 603 may be the processor 605 of the first network node 111, or an application running on such processor.

Obtaining may be understood as e.g., receiving, e.g., via the first link 141.

Transmitting 1003 a third indication; the third indication may indicate whether or not, if, during a second time period, the respective condition to switch from the source link to the target link remains unfulfilled by any of the target links in the plurality of target links after one of: i) a value based on expiration of a timer, and ii) receipt of a number of out of synchronization messages, the wireless device 130 is to: a) refrain from declaring radio link failure, and b) switch from the source link to a second target link selected from the plurality of target links. The first network node 111 may be configured to perform this transmitting 1003 action, e.g. by means of the transmitting unit 601 within the first network node 111, configured to perform this action.

In some embodiments, the transmitting 1003 of the third indication may be based on the obtained second indication.

The timer may be a T310 timer.

Transmitting 1004 a fourth indication; the fourth indication may indicate a time period to be waited prior to initiating the switch from the source link to the selected second target link. The first network node 111 may be configured to perform this transmitting 1004 action, e.g. by means of the transmitting unit 601 within the first network node 111, configured to perform this action.

Any of the transmitting actions performed by the first network node 111 may be performed to the wireless device 130.

Any of the obtaining actions performed by the first network node 111 may be performed by, e.g., receiving from the wireless device 130.

Other units 604 may be comprised in the first network node 111.

The first network node 111 may also be configured to communicate user data with a host application unit in a host computer 1310, e.g., via another link such as 1350.

In FIG. 6, optional units are indicated with dashed boxes.

The first network node 111 may comprise an interface unit to facilitate communications between the first network node 111 and other nodes or devices, e.g., the second network node 112, the wireless device 130, the host computer 1310, or any of the other nodes. In some particular examples, the interface may, for example, include a transceiver configured to transmit and receive radio signals over an air interface in accordance with a suitable standard.

Figure 13:
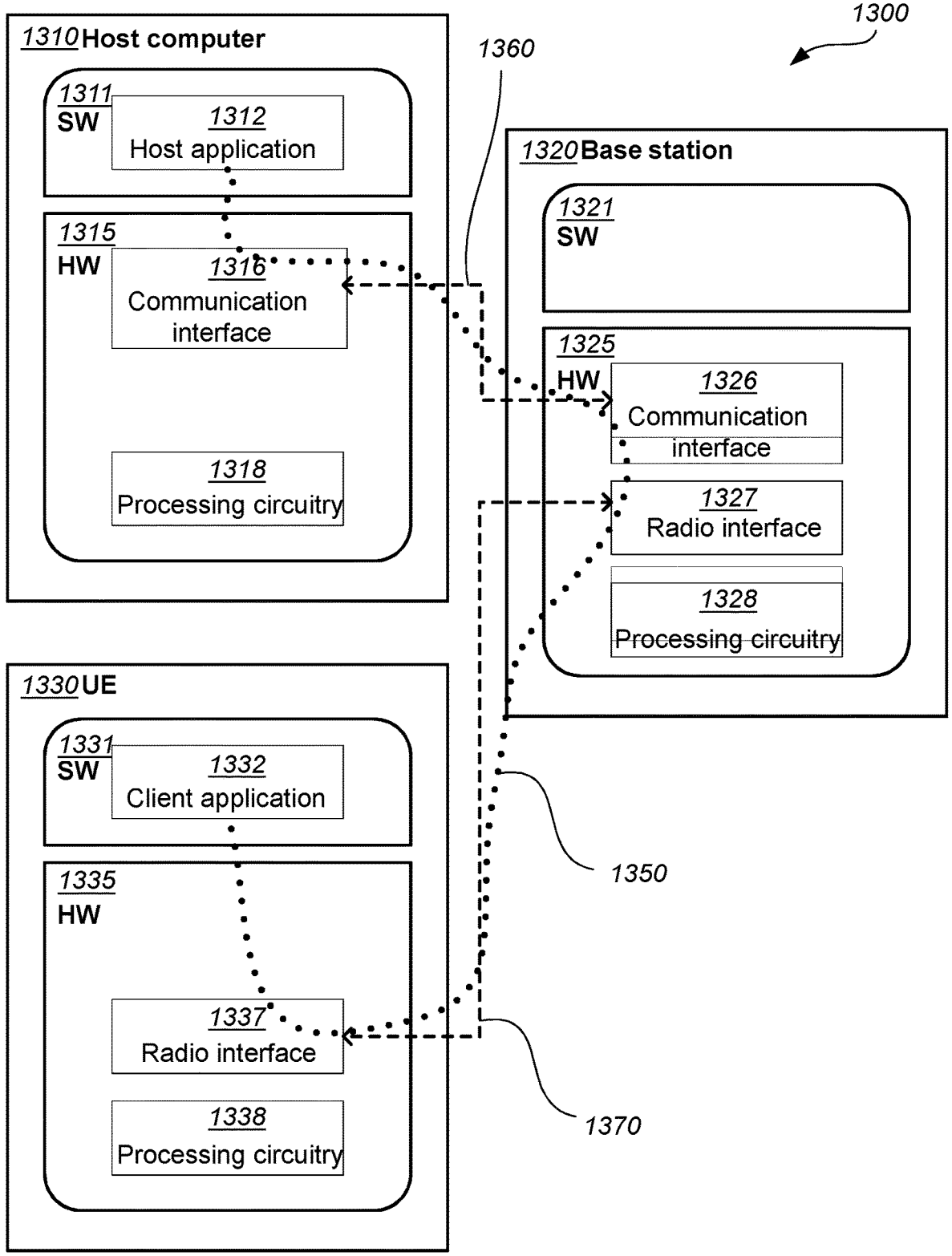
FIG. 13 is a generalized block diagram of a host computer communicating via a base station with a user equipment over a partially wireless connection, according to embodiments herein.

The first network node 111 may comprise an arrangement as shown in FIG. 6 or in FIG. 13.

The wireless device 130 embodiments relate to FIG. 11, FIG. 7 and FIGS. 12-17.

A method, performed by a wireless device such as the wireless device 130, is described herein. The method may be understood to be for handling the link switch from the source link, such as the first link 141, to the target link, such as the second link 142. The wireless device 130 may be operating in the wireless communications network 100.

The method may comprise one or more of the following actions.

In some embodiments all the actions may be performed. One or more embodiments may be combined, where applicable. All possible combinations are not described to simplify the description. A first non-limiting combination is depicted in panel a) of FIG. 11. A second non-limiting combination is depicted in panel b) of FIG. 11. Some actions may be performed in a different order than that shown in FIG. 11.

Obtaining 1101 the first indication; the first indication may indicate to select, out of the plurality of target links simultaneously fulfilling the respective condition to switch from the source link to the target link, the first target link to link switch from the source link to the selected first target link; the selecting may be based on at least one of: the RSRP, value, the RSRQ, value, the SINR, value, the priority, the RACH, resources, the cell in which latest measurements were made, or the frequency, of the target links in the plurality of target links. The wireless device 130 may be configured to perform this obtaining action 1101, e.g., by means of an obtaining unit 701 within the wireless device 130, configured to perform this action. The obtaining unit 701 may be the processor 707 of the wireless device 130, or an application running on such processor.

The first indication may be obtained in this Action 1101 by, e.g., receiving it from the first network node 111 operating in the wireless communications network 100, or it may be obtained by e.g., retrieving it from a memory in the wireless device 130, or otherwise obtaining it from another node in the wireless communications network 130.

Executing 1107 the link switch from the source link to the target link, based on the obtained first indication. The wireless device 130 may be configured to perform this executing action 1107, e.g., by means of an executing unit 702 within the wireless device 130, configured to perform this action. The executing unit 1102 may be the processor 707 of the wireless device 130, or an application running on such processor.

In some embodiments, the first indication may be comprised in the RRCConnectionReconfiguration message.

The first indication may be comprised in an information element.

For example, the information element may be the mobilityControlInfo information element.

In some embodiments, the first indication may indicate that the first target link is to be selected as having at least one of: a) the strongest RSRP value; b) the strongest RSRQ value;

c. the strongest SINR value; d) the highest priority; e) the allocated RACH resources which are first occurring in time; f) the cell in which the wireless device 130 performed latest measurement; g) the intra-frequency; h) the inter-frequency; or i) fulfilled a condition based on a combination of any of a-h. The respective condition may be obtained from the first network node 111 in another indication; the another indication may indicate that the wireless device 130 is to perform the link switch responsive to fulfilment of the respective condition; the another indication may indicate the first configuration of the target link relative to the second configuration of the source link.

In some embodiments, the method may further comprise one or more of the actions of:

Transmitting 1102, to the first network node 111, the second indication; the second indication may indicate the probability of radio link failure. The wireless device 130 may be configured to perform this transmitting 1102 action, e.g. by means of a transmitting unit 703 within the wireless device 130, configured to perform this action. The transmitting unit 703 may be a processor 707 of the wireless device 130, or an application running on such processor.

Obtaining 1103 the third indication; the third indication may indicate whether or not, if, during the second time period, the respective condition to switch from the source link to the target link remains unfulfilled by any of the target links in the plurality of target links after one of: i) the value based on expiration of the timer and ii) the receipt of the number of out of synchronization messages, the wireless device 130 is to: a) refrain from declaring radio link failure, and b) switch from the source link to a second target link selected from the plurality of target links. The wireless device 130 may be configured to perform this obtaining action 1103, e.g., by means of the obtaining unit 701, configured to perform this action.

In some embodiments, the obtaining 1103 of the third indication may be based on the transmitted second indication.

The timer may be a T310 timer.

Obtaining 1104 the fourth indication; the fourth indication may indicate the time period to be waited prior to initiating the link switch from the source link to the selected second target link. The wireless device 130 may be configured to perform this obtaining action 1104, e.g., by means of the obtaining unit 701, configured to perform this action.

Refraining 1106 from declaring RLF based on at least one of: the third indication or the fourth indication. The wireless device 130 may be configured to perform this refraining action 1106, e.g., by means of a refraining unit 704 within the wireless device 130, configured to perform this action. The refraining unit 704 may be a processor 707 of the wireless device 130, or an application running on such processor.

Selecting 1105 the first target link based on the first indication; the link switch may be executed based on the selected first target link. The wireless device 130 may be configured to perform this selecting action 1105, e.g., by means of a selecting unit 705 within the wireless device 130, configured to perform this action. The selecting unit 705 may be a processor 707 of the wireless device 130, or an application running on such processor. The first indication used in the selecting 1105 may be the obtained first indication, or it may be obtained by e.g., retrieving it from a memory in the wireless device 130, or otherwise obtaining it from another node in the wireless communications network 130.

Any of the transmitting actions performed by the wireless device 130 may be performed to the first network node 111.

Any of the obtaining actions performed by wireless device 130 the may be performed by, e.g., receiving from the first network node 111.

Other units 706 may be comprised in the wireless device 130.

The wireless device 130 may also be configured to communicate user data with a host application unit in a host computer 1310, e.g., via another link such as 1350.

In FIG. 7, optional units are indicated with dashed boxes.

The wireless device 130 may comprise an interface unit to facilitate communications between the wireless device 130 and other nodes or devices, e.g., the first network node 111, the second network node 112, the host computer 1310, or any of the other nodes. In some particular examples, the interface may, for example, include a transceiver configured to transmit and receive radio signals over an air interface in accordance with a suitable standard.

The wireless device 130 may comprise an arrangement as shown in FIG. 7 or in FIG. 13.

Selected numbered examples related to embodiments herein:

1. A method, performed by a first network node (111), for handling a link switch from a source link to a target link, the first network node (111) operating in a wireless communications network (100), the method comprising:
   transmitting (1001), to a wireless device (130) operating in the wireless communications network (100), a first indication, the first indication indicating to select, out of a plurality of target links simultaneously fulfilling a respective condition to switch from a source link to a target link, a first target link to switch from the source link to the selected first target link, the selecting being based on at least one of: a Reference Signal Received Power, RSRP, value, a Reference Signal Received Quality, RSRQ, value, a Signal to Interference and noise ratio, SINR, value, a priority, Random Access Channel, RACH, resources, a cell in which latest measurements were made, or a frequency, of the target links in the plurality of target links, and
   handling (1005) the link switch from the source link to the target link, based on the transmitted first indication.

2. The method according to example 1, wherein the first indication is comprised in an RRCConnectionReconfiguration message.

3. The method according to any of examples 1-2, wherein the first indication is comprised in an information element.

4. The method according to example 3, wherein the information element is a mobilityControlInfo information element.

5. The method according to any of examples 1-4, wherein the first indication indicates that the first target link is to be selected as having at least one of:
   a. a strongest RSRP value;
   b. a strongest RSRQ value;
   c. a strongest SINR value;
   d. a highest priority;
   e. allocated RACH resources which are first occurring in time;
   f. a cell in which the wireless device 130 performed latest measurement;
   g. an intra-frequency;
   h. an inter-frequency; or
   i. fulfilled a condition based on a combination of any of a-h.

6. The method according to any of examples 1-5, wherein the respective condition is transmitted by the first network node (111) in another indication, the first indication indicating that the wireless device (130) is to perform a link switch responsive to fulfilment of the respective condition, wherein the another indication indicates a first configuration of the target link relative to a second configuration of the source link.

7. The method according to any of examples 1-6, further comprising:
   obtaining (1002), from the wireless device (130), a second indication, the second indication indicating a probability of radio link failure.

8. The method according to any of examples 1-7, wherein the method further comprises:
   transmitting (1003) a third indication, the third indication indicating whether or not, if, during a second time period, the respective condition to switch from the source link to the target link remains unfulfilled by any of the target links in the plurality of target links after one of: i) a value based on expiration of a timer and ii) receipt of a number of out of synchronization messages, the wireless device (130) is to: a) refrain from declaring radio link failure, and b) switch from the source link to a second target link selected from the plurality of target links.

9. The method according to examples 7 and 8, wherein the transmitting (1003) of the third indication is based on the obtained second indication.

10. The method according to any of examples 7-9, further comprising:
   transmitting (1004) a fourth indication, the fourth indication indicating a time period to be waited prior to initiating the switch from the source link to the selected second target link.

11. The method according to any of examples 7-10, wherein the timer is a T310 timer.

12. A method, performed by a wireless device (130), for handling a link switch from a source link to a target link, the wireless device (130) operating in a wireless communications network (100), the method comprising:
obtaining (1101), e.g., from a first network node (111) operating in the wireless communications network (100), a first indication, the first indication indicating to select, out of a plurality of target links simultaneously fulfilling a respective condition to switch from a source link to a target link, a first target link to switch from the source link to the selected first target link, the selecting being based on at least one of: a Reference Signal Received Power, RSRP, value, a Reference Signal Received Quality, RSRQ, value, a Signal to Interference and noise ratio, SINR, value, a priority, Random Access Channel, RACH, resources, a cell in which latest measurements were made, or a frequency, of the target links in the plurality of target links, and
executing (1107) the link switch from the source link to the target link, based on the obtained first indication.

13. The method according to example 12, wherein the first indication is comprised in an RRCConnectionReconfiguration message.

14. The method according to any of examples 12-13, wherein the first indication is comprised in an information element.

15. The method according to example 14, wherein the information element is a mobilityControlInfo information element.

16. The method according to any of examples 12-15, wherein the first indication indicates that the first target link is to be selected as having at least one of:
a. a strongest RSRP value;
b. a strongest RSRQ value;
c. a strongest SINR value;
d. a highest priority;
e. allocated RACH resources which are first occurring in time;
f. a cell in which the wireless device 130 performed latest measurement;
g. an intra-frequency;
h. an inter-frequency; or
i. fulfilled a condition based on a combination of any of a-h.

17. The method according to any of examples 12-16, wherein the respective condition is obtained from a first network node (111) operating in the wireless communications network 100, in another indication, the first indication indicating that the wireless device (130) is to perform a link switch responsive to fulfilment of the respective condition, wherein the another indication indicates a first configuration of the target link relative to a second configuration of the source link.

18. The method according to any of examples 12-17, further comprising:
transmitting (1102), to a first network node (111) operating in the wireless communications network 100, a second indication, the second indication indicating a probability of radio link failure.

19. The method according to any of examples 12-18, wherein the method further comprises:
obtaining (1103) a third indication, the third indication indicating whether or not, if, during a second time period, the respective condition to switch from the source link to the target link remains unfulfilled by any of the target links in the plurality of target links after one of: i) a value based on expiration of a timer and ii) receipt of a number of out of synchronization messages, the wireless device (130) is to: a) refrain from declaring radio link failure, and b) switch from the source link to a second target link selected from the plurality of target links.

20. The method according to examples 18 and 19, wherein the obtaining (1103) of the third indication is based on the transmitted second indication.

21. The method according to any of examples 18-20, further comprising:
obtaining (1104) a fourth indication, the fourth indication indicating a time period to be waited prior to initiating the link switch from the source link to the selected second target link.

22. The method according to any of examples 18-21, wherein the timer is a T310 timer.

23. The method according to any of examples 18-22, further comprising:
refraining (1106) from declaring RLF based on at least one of: the third indication or the fourth indication.

24. The method according to any of examples 12-23, further comprising:
selecting (1105) the first target link based on the first indication, and wherein the link switch is executed based on the selected first target link.

Further Extensions and Variations

Figure 12:
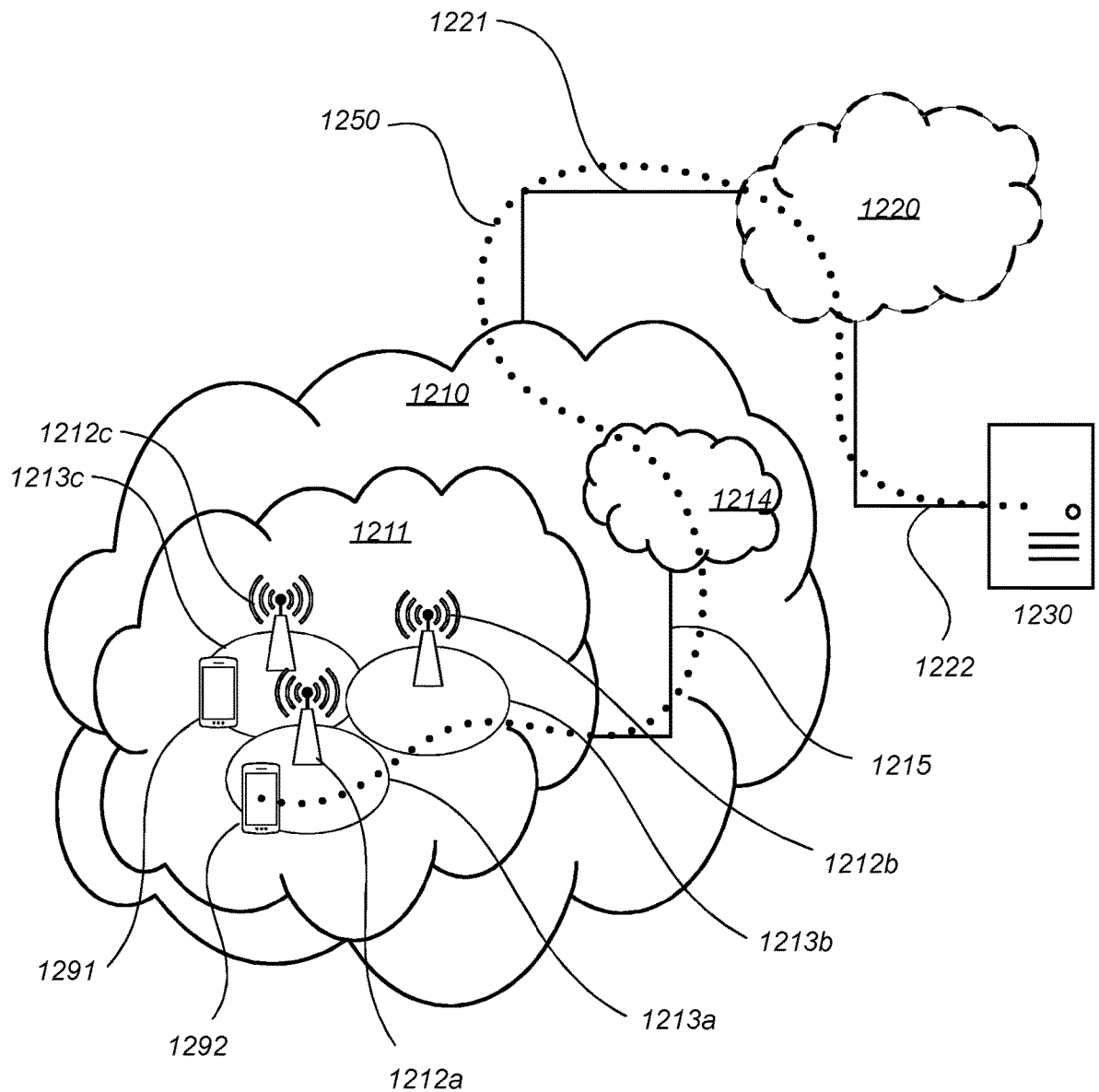
FIG. 12 is a schematic block diagram illustrating a telecommunication network connected via an intermediate network to a host computer, according to embodiments herein.

FIG. 12: Telecommunication Network Connected Via an Intermediate Network to a Host Computer in Accordance with Some Embodiments With reference to FIG. 12, in accordance with an embodiment, a communication system includes telecommunication network 1210 such as the communications network 100, for example, a 3GPP-type cellular network, which comprises access network 1211, such as a radio access network, and core network 1214. Access network 1211 comprises a plurality of network nodes such as any, or both, of the first network node 111 and the second network node 112. For example, base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A plurality of user equipments, such as the wireless device 130 may be comprised in the communications network 100. In FIG. 12, a first UE 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212. Any of the UEs 1291, 1292 may be considered examples of the wireless device 130.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

In relation to FIGS. 13, 14, 15, 16, and 17, which are described next, it may be understood that a UE is an example of the wireless device 130, and that any description provided for the UE equally applies to the wireless device 130. It may be also understood that the base station may be considered an example of any, or both, of the first network node 111 and the second network node 112, and that any description provided for the base station equally applies to any, or both, of the first network node 111 and the second network node 112.

FIG. 13: Host Computer Communicating Via a Base Station with a User Equipment Over a Partially Wireless Connection in Accordance with Some Embodiments Example implementations, in accordance with an embodiment, of the wireless device 130, e.g., a UE, and any, or both, of the first network node 111 and the second network node 112, e.g., a base station and host computer discussed in the preceding paragraphs will now be described with reference to FIG. 13. In communication system 1300, such as the communications network 100, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes any, or both, of the first network node 111 and the second network node 112, exemplified in FIG. 13 as a base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with the wireless device 130, exemplified in FIG. 13 as a UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the spectrum efficiency, and latency, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

The first network node 111 embodiments relate to FIG. 3, FIG. 6 and FIGS. 12-17.

The first network node 111 may also be configured to communicate user data with a host application unit in a host computer 1310, e.g., via another link such as 1350.

The first network node 111 may comprise an interface unit to facilitate communications between the first network node 111 and other nodes or devices, e.g., the second network node 112, the wireless device 130, the host computer 1310, or any of the other nodes. In some particular examples, the interface may, for example, include a transceiver configured to transmit and receive radio signals over an air interface in accordance with a suitable standard.

The first network node 111 may comprise an arrangement as shown in FIG. 6 or in FIG. 13.

The wireless device 130 embodiments relate to FIG. 4, FIG. 7 and FIGS. 12-17.

The wireless device 130 may also be configured to communicate user data with a host application unit in a host computer 1310, e.g., via another link such as 1350.

The wireless device 130 may comprise an interface unit to facilitate communications between the wireless device 130 and other nodes or devices, e.g., the first network node 111, the second network node 112, the host computer 1310, or any of the other nodes. In some particular examples, the interface may, for example, include a transceiver configured to transmit and receive radio signals over an air interface in accordance with a suitable standard.

The wireless device 130 may comprise an arrangement as shown in FIG. 7 or in FIG. 13.

FIG. 14: Methods Implemented in a Communication System Including a Host Computer, a Base Station and a User Equipment in Accordance with Some Embodiments FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
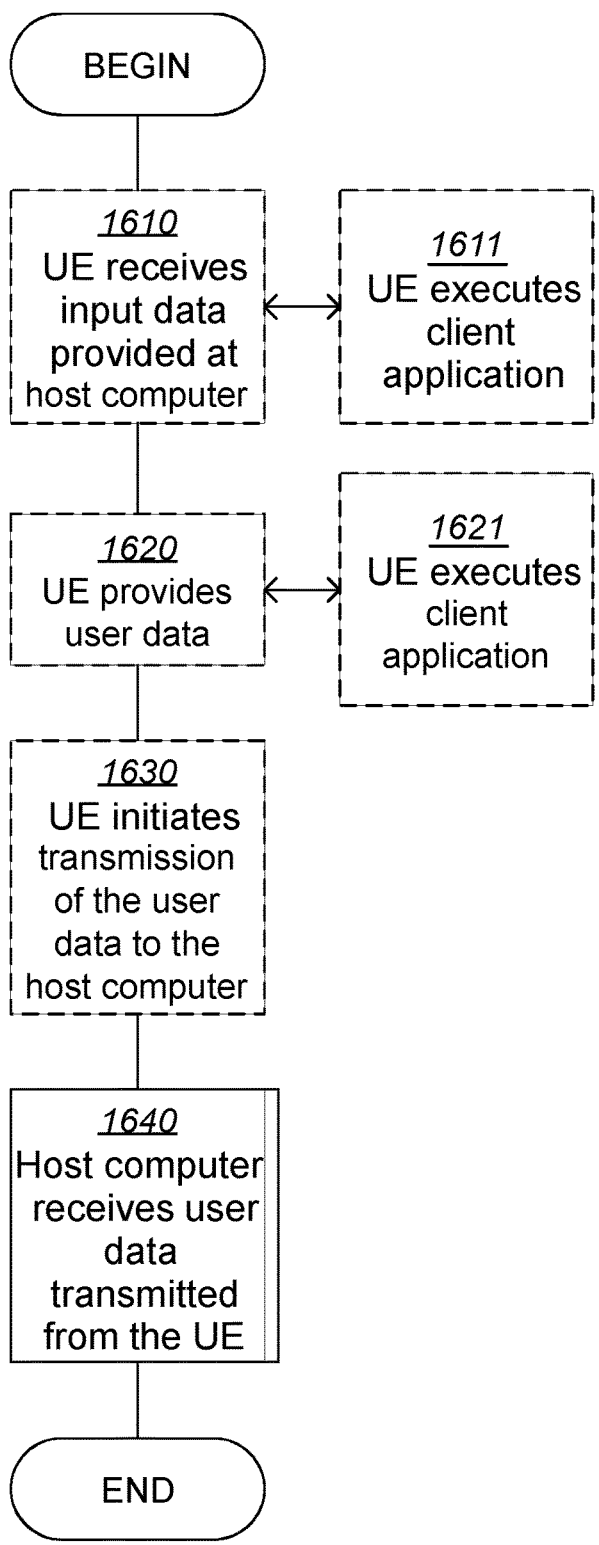
FIG. 16 is a flowchart depicting embodiments of a method in a communications system including a host computer, a base station and a user equipment, according to embodiments herein.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
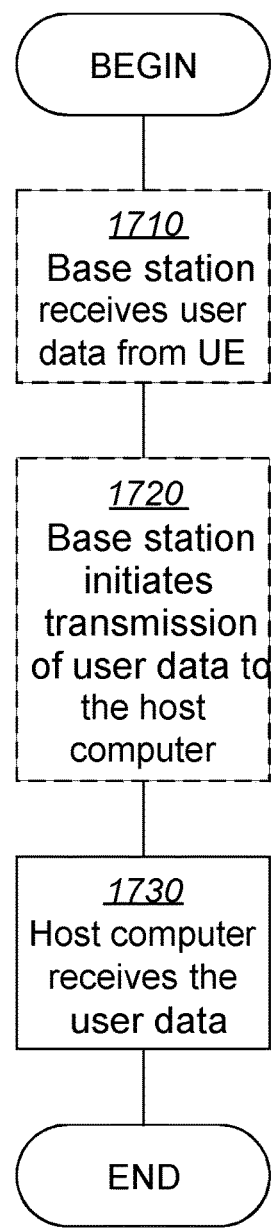
FIG. 17 is a flowchart depicting embodiments of a method in a communications system including a host computer, a base station and a user equipment, according to embodiments herein.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the first network node 111.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by any of the first network node 111.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions described herein as performed by the first network node 111.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by the first network node 111.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with a base station, the UE comprising a radio interface and processing circuitry configured to perform one or more of the actions described herein as performed by the wireless device 130.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the wireless device 130.

26. The communication system of embodiment 25, further including the UE.

27. The communication system of embodiment 26, wherein the cellular network further includes a base station configured to communicate with the UE.

28. The communication system of embodiment 26 or 27, wherein:
   the processing circuitry of the host computer is configured to execute a host application, thereby providing the user data; and
   the UE's processing circuitry is configured to execute a client application associated with the host application.

31. A method implemented in a user equipment (UE), comprising one or more of the actions described herein as performed by the wireless device 130.

35. A method implemented in a communication system including a host computer, a base station and a user equipment (UE), the method comprising:
 at the host computer, providing user data; and
 at the host computer, initiating a transmission carrying the user data to the UE via a cellular network comprising the base station, wherein the UE performs one or more of the actions described herein as performed by the wireless device 130.

36. The method of embodiment 35, further comprising:
 at the UE, receiving the user data from the base station.

41. A user equipment (UE) configured to communicate with a base station, the UE comprising a radio interface and processing circuitry configured to perform one or more of the actions described herein as performed by the wireless device 130.

45. A communication system including a host computer comprising:
 a communication interface configured to receive user data originating from a transmission from a user equipment (UE) to a base station,
 wherein the UE comprises a radio interface and processing circuitry, the UE's processing circuitry configured to: perform one or more of the actions described herein as performed by the wireless device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
 the processing circuitry of the host computer is configured to execute a host application; and
 the UE's processing circuitry is configured to execute a client application associated with the host application, thereby providing the user data.

49. The communication system of embodiment 46 or 47, wherein:
 the processing circuitry of the host computer is configured to execute a host application, thereby providing request data; and
 the UE's processing circuitry is configured to execute a client application associated with the host application, thereby providing the user data in response to the request data.

51. A method implemented in a user equipment (UE), comprising one or more of the actions described herein as performed by the wireless device 130.

52. The method of embodiment 51, further comprising:
 providing user data; and
 forwarding the user data to a host computer via the transmission to the base station.

55. A method implemented in a communication system including a host computer, a base station and a user equipment (UE), the method comprising:
 at the host computer, receiving user data transmitted to the base station from the UE, wherein the UE performs one or more of the actions described herein as performed by the wireless device 130.

56. The method of embodiment 55, further comprising:
 at the UE, providing the user data to the base station.

57. The method of embodiment 56, further comprising:
 at the UE, executing a client application, thereby providing the user data to be transmitted; and
 at the host computer, executing a host application associated with the client application.

58. The method of embodiment 56, further comprising:
 at the UE, executing a client application; and
 at the UE, receiving input data to the client application, the input data being provided at the host computer by executing a host application associated with the client application,
 wherein the user data to be transmitted is provided by the client application in response to the input data.

61. A base station configured to communicate with a user equipment (UE), the base station comprising a radio interface and processing circuitry configured to perform one or more of the actions described herein as performed by the first network node 111.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the first network node 111.

66. The communication system of embodiment 65, further including the base station.

67. The communication system of embodiment 66, further including the UE, wherein the UE is configured to communicate with the base station.

68. The communication system of embodiment 67, wherein:
 the processing circuitry of the host computer is configured to execute a host application;
 the UE is configured to execute a client application associated with the host application, thereby providing the user data to be received by the host computer.

71. A method implemented in a base station, comprising one or more of the actions described herein as performed by any of the first network node 111.

75. A method implemented in a communication system including a host computer, a base station and a user equipment (UE), the method comprising:
 at the host computer, receiving, from the base station, user data originating from a transmission which the base station has received from the UE, wherein the UE performs one or more of the actions described herein as performed by the wireless device 130.

76. The method of embodiment 75, further comprising:
 at the base station, receiving the user data from the UE.

77. The method of embodiment 76, further comprising:
 at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
 3GPP 3rd Generation Partnership Project
 5G 5th Generation
 5GCN 5G Core Network
 ANR Automatic Neighbor Relations
 CRS Cell Reference Signal
 DC Dual Connectivity
 EPC Evolved Packet Core EN-DC Eutran-NR Dual Connectivity
eNB RAN node (RBS) supporting LTE radio access technology
gNB RAN node (RBS) supporting NR radio access technology
HO Handover
KPI Key Performance Indicator
LTE Long Term Evolution
MCG Master Cell Group (related to master node in dual connectivity)
MeNB Master eNB
NR New Radio (5G)
NCGINR Cell Global Identity
NSA Non-Stand-alone NR
OAM Operation And Management
PCI Physical Cell Identity
PSS Primary Synchronization Signal
RACH Random Access Channel
RAN Radio Access Network
RAT Radio Access Technology
RLF Radio Link Failure
RSRP Reference Signal Received Power
RSRQ Reference Signal Received Quality
SA Stand-alone NR
SINR Signal to Interference and noise ratio
SSS Secondary Synchronization Signal
UE User Equipment

REFERENCES

1. WO 2018/132051.

The invention claimed is:

1. A method, performed by a first network node, for handling a link switch, by a wireless device, from a source link to a target link, the first network node and the wireless device operating in a wireless communications network, the method comprising:
transmitting, to the wireless device, a first indication, the first indication indicating to select, out of a plurality of target links simultaneously fulfilling a respective condition to switch from a source link to a target link, a first target link to switch from the source link to the selected first target link, the selecting being based on at least one of: a Reference Signal Received Power, RSRP, value, a Reference Signal Received Quality, RSRQ, value, a Signal to Interference and noise ratio, SINR, value, a priority, Random Access Channel, RACH, resources, a cell in which latest measurements were made, or a frequency, of the respective target links in the plurality of target links;
obtaining, from the wireless device, a second indication, the second indication indicating a probability of radio link failure;
transmitting a third indication, the third indication indicating whether or not, if, during a second time period, the respective condition to switch from the source link to the target link remains unfulfilled by all of the target links in the plurality of target links after one of: i) a value based on expiration of a timer and ii) receipt of a number of out of synchronization messages, the wireless device is to: a) refrain from declaring radio link failure, and b) switch from the source link to a second target link selected from the plurality of target links, and transmitting of the third indication is based on the obtained second indication;
transmitting a fourth indication, the fourth indication indicating a time period to be waited prior to initiating the switch from the source link to the selected second target link; and
handling the link switch from the source link to the target link, based on the transmitted first indication.

2. The method according to claim 1, wherein the first indication is comprised in an RRCConnectionReconfiguration message.

3. The method according to claim 1, wherein the first indication indicates that the first target link is to be selected as having at least one of:
a. a strongest RSRP value;
b. a strongest RSRQ value;
c. a strongest SINR value;
d. a highest priority;
e. allocated RACH resources which are first occurring in time;
f. cell in which the wireless device 130 performed a latest measurement;
g. an intra-frequency;
h. an inter-frequency; or
i. fulfilled a condition based on a combination of any of a-h.

4. The method according to claim 1, wherein the respective condition is transmitted by the first network node in another indication, the first indication indicating that the wireless device is to perform the link switch responsive to fulfilment of the respective condition, wherein the another indication indicates a first configuration of the target link relative to a second configuration of the source link.

5. The method according to claim 1, wherein the transmitting of the first indication is performed together with the transmitting of the third indication and the transmitting of the fourth indication.

6. A method, performed by a wireless device, for handling a link switch from a source link to a target link, the wireless device operating in a wireless communications network, the method comprising:
obtaining, a first indication, the first indication indicating to select, out of a plurality of target links simultaneously fulfilling a respective condition to switch from a source link to a target link, a first target link to switch from the source link to the selected first target link, the selecting being based on at least one of: a Reference Signal Received Power, RSRP, value, a Reference Signal Received Quality, RSRQ, value, a Signal to Interference and noise ratio, SINR, value, a priority, Random Access Channel, RACH, resources, a cell in which latest measurements were made, or a frequency, of the respective target links in the plurality of target links;
transmitting, to a first network node operating in the wireless communications network, a second indication, the second indication indicating a probability of radio link failure;
obtaining, from the first network node operating in the wireless communications network, a third indication, the third indication indicating whether or not, if, during a second time period, the respective condition to switch from the source link to the target link remains unfulfilled by all of the target links in the plurality of target links after one of: i) a value based on expiration of a timer and ii) receipt of a number of out of synchronization messages, the wireless device is to: a) refrain from declaring radio link failure, and b) switch from the source link to a second target link selected from the plurality of target links, and obtaining of the third indication is based on the transmitted second indication;

obtaining, from the first network node in the wireless communication network, a fourth indication, the fourth indication indicating a time period to be waited prior to initiating the switch from the source link to the selected second target link; and executing the link switch from the source link to the target link, based on the obtained first indication.

7. The method according to claim 6, wherein the first indication is obtained from a first network node operating in the wireless communications network.

8. The method according to claim 6, wherein the first indication indicates that the first target link is to be selected as having at least one of:
   a. a strongest RSRP value;
   b. a strongest RSRQ value;
   c. a strongest SINR value;
   d. a highest priority;
   e. allocated RACH resources which are first occurring in time;
   f. a cell in which the wireless device 130 performed a latest measurement;
   g. an intra-frequency;
   h. an inter-frequency; or
   i. fulfilled a condition based on a combination of any of a-h.

9. The method according to claim 6, wherein the respective condition is obtained from a first network node operating in the wireless communications network, in another indication, the first indication indicating that the wireless device is to perform the link switch responsive to fulfilment of the respective condition, wherein the another indication indicates a first configuration of the target link relative to a second configuration of the source link.

10. A first network node, for handling a link switch, by a wireless device, from a source link to a target link, the first network node and the wireless device being configured to operate in a wireless communications network, the first network node being further configured to:

transmit, to the wireless device, a first indication, the first indication being configured to indicate to select, out of a plurality of target links simultaneously fulfilling a respective condition to switch from a source link to a target link, a first target link to switch from the source link to the selected first target link, the selecting being configured to be based on at least one of: a Reference Signal Received Power, RSRP, value, a Reference Signal Received Quality, RSRQ, value, a Signal to Interference and noise ratio, SINR, value, a priority, Random Access Channel, RACH, resources, a cell in which latest measurements were made, or a frequency, of the respective target links in the plurality of target links;

obtain, from the wireless device, a second indication, the second indication indicating a probability of radio link failure;

transmit a third indication, the third indication indicating whether or not, if, during a second time period, the respective condition to switch from the source link to the target link remains unfulfilled by all of the target links in the plurality of target links after one of: i) a value based on expiration of a timer and ii) receipt of a number of out of synchronization messages, the wireless device is to: a) refrain from declaring radio link failure, and b) switch from the source link to a second target link selected from the plurality of target links, and to transmit of the third indication is based on the obtained second indication;

transmit a fourth indication, the fourth indication indicating a time period to be waited prior to initiating the switch from the source link to the selected second target link; and handle the link switch from the source link to the target link, based on the transmitted first indication.

11. A wireless device, for handling a link switch from a source link to a target link, the wireless device being configured to operate in a wireless communications network, the wireless device being further configured to:

obtain, a first indication, the first indication being configured to indicate to select, out of a plurality of target links simultaneously fulfilling a respective condition to switch from a source link to a target link, a first target link to switch from the source link to the selected first target link, the selecting being configured to be based on at least one of: a Reference Signal Received Power, RSRP, value, a Reference Signal Received Quality, RSRQ, value, a Signal to Interference and noise ratio, SINR, value, a priority, Random Access Channel, RACH, resources, a cell in which latest measurements were made, or a frequency, of the respective target links in the plurality of target links;

transmit, to a first network node operating in the wireless communications network, a second indication, the second indication indicating a probability of radio link failure;

obtain, from the first network node operating in the wireless communications network, a third indication, the third indication indicating whether or not, if, during a second time period, the respective condition to switch from the source link to the target link remains unfulfilled by all of the target links in the plurality of target links after one of: i) a value based on expiration of a timer and ii) receipt of a number of out of synchronization messages, the wireless device is to: a) refrain from declaring radio link failure, and b) switch from the source link to a second target link selected from the plurality of target links, and to obtain of the third indication is based on the transmitted second indication;

obtain, from the first network node in the wireless communication network, a fourth indication, the fourth indication indicating a time period to be waited prior to initiating the switch from the source link to the selected second target link; and execute the link switch from the source link to the target link, based on the first indication configured to be obtained.

* * * * *